United States Patent
Patel

(10) Patent No.: US 11,112,237 B2
(45) Date of Patent: Sep. 7, 2021

(54) USING MAP INFORMATION TO SMOOTH OBJECTS GENERATED FROM SENSOR DATA

(71) Applicant: Waymo LLC, Mountain View, CA (US)

(72) Inventor: Nirmal Patel, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 520 days.

(21) Appl. No.: 15/350,473

(22) Filed: Nov. 14, 2016

(65) Prior Publication Data

US 2018/0135972 A1 May 17, 2018

(51) Int. Cl.
*G01C 3/08* (2006.01)
*G01B 11/24* (2006.01)
(Continued)

(52) U.S. Cl.
CPC .............. *G01B 11/24* (2013.01); *B60K 35/00* (2013.01); *G01B 11/02* (2013.01); *G01C 21/30* (2013.01);
(Continued)

(58) Field of Classification Search
CPC ........ G01B 11/24; G01B 11/02; G60K 35/00; G01C 21/30; G01C 21/3697; G01S 17/42;
(Continued)

(56) References Cited

U.S. PATENT DOCUMENTS

| 5,258,822 A | * | 11/1993 | Nakamura | ............. G02B 26/10 356/140 |
| 5,596,347 A | * | 1/1997 | Robertson | ........... G06F 3/04812 345/157 |

(Continued)

FOREIGN PATENT DOCUMENTS

| DE | 102009020300 A1 | 11/2010 |
| JP | 2002002425 A | 1/2002 |

(Continued)

OTHER PUBLICATIONS

International Search Report and Written Opinion for PCT Application No. PCT/US2017/060554 dated May 29, 2018. 23 pages.

(Continued)

*Primary Examiner* — Samantha K Nickerson
(74) *Attorney, Agent, or Firm* — Botos Churchill IP Law

(57) ABSTRACT

The technology relates to generating a representation of an object detected by a perception system of a vehicle. For instance, a set of data points corresponding to an object is received from the perception system. Map information identifying shapes and locations of lanes as well as locations of center points for the lanes is retrieved. A representative point of the center points is selected based on the set of data points. A first position is determined based on the location of the representative point. A second position is determined based on the set of data points. The first and second positions are used to determine a third position for a representation of the object based on a distance the first position and the second position. The he representation of the object is generated using the third position. The representation of the object is displayed on a display of the vehicle.

23 Claims, 17 Drawing Sheets

(51) Int. Cl.
| | |
|---|---|
| *G06T 19/00* | (2011.01) |
| *G01C 21/30* | (2006.01) |
| *G01C 21/36* | (2006.01) |
| *G01S 17/931* | (2020.01) |
| *B60K 35/00* | (2006.01) |
| *G01B 11/02* | (2006.01) |
| *G01S 17/42* | (2006.01) |
| *G05D 1/02* | (2020.01) |
| *G06K 9/00* | (2006.01) |

(52) U.S. Cl.
CPC .......... *G01C 21/3697* (2013.01); *G01S 17/42* (2013.01); *G01S 17/931* (2020.01); *G05D 1/024* (2013.01); *G06K 9/00201* (2013.01); *G06K 9/00798* (2013.01); *G06K 9/00805* (2013.01); *G06T 19/006* (2013.01); *B60K 2370/16* (2019.05)

(58) Field of Classification Search
CPC ..... G01S 17/936; G01S 17/931; G05D 1/024; G06K 9/00201; G06K 9/00798; G06K 9/00805; G06T 19/006; B60K 35/00; B60K 2370/16
USPC ................................. 356/3.01–5.15
See application file for complete search history.

(56) References Cited

U.S. PATENT DOCUMENTS

| | | | | |
|---|---|---|---|---|
| 5,793,310 | A * | 8/1998 | Watanabe | G01C 21/3635 340/990 |
| 5,964,822 | A * | 10/1999 | Alland | G01S 17/931 701/301 |
| 6,549,846 | B1 | 4/2003 | Dance et al. | |
| 6,888,622 | B2 * | 5/2005 | Shimomura | G01S 7/415 180/169 |
| 8,055,445 | B2 | 11/2011 | Schiffmann et al. | |
| 9,098,754 | B1 | 8/2015 | Stout et al. | |
| 9,420,412 | B2 | 8/2016 | Ho | |
| 2005/0149251 | A1 * | 7/2005 | Donath | G01C 21/26 701/532 |
| 2010/0097457 | A1 * | 4/2010 | Zhang | G06K 9/00798 348/119 |
| 2010/0217517 | A1 * | 8/2010 | Oohashi | G01C 21/30 701/533 |
| 2012/0062372 | A1 * | 3/2012 | Augst | G06K 9/00798 340/435 |
| 2013/0128121 | A1 * | 5/2013 | Agarwala | G06T 3/0093 348/607 |
| 2013/0141520 | A1 * | 6/2013 | Zhang | G06K 9/4638 348/36 |
| 2014/0093159 | A1 * | 4/2014 | Nguyen | G06T 5/002 382/154 |
| 2014/0375816 | A1 | 12/2014 | Maihoefer | |
| 2015/0085273 | A1 * | 3/2015 | Itoh | G01C 3/08 356/4.01 |
| 2016/0176358 | A1 * | 6/2016 | Raghu | B60R 1/00 382/104 |
| 2016/0349066 | A1 * | 12/2016 | Chung | G01C 21/3658 |
| 2017/0124476 | A1 * | 5/2017 | Levinson | G01S 17/931 |
| 2017/0232890 | A1 * | 8/2017 | Lewis | B60Q 9/002 348/148 |
| 2018/0005051 | A1 * | 1/2018 | Tsuruta | G06T 7/13 |

FOREIGN PATENT DOCUMENTS

| | | |
|---|---|---|
| JP | 2003281699 A | 10/2003 |
| JP | 2004237885 A | 8/2004 |
| JP | 2005145187 A | 6/2005 |
| JP | 5787485 B2 | 9/2015 |
| JP | 2015210720 A | 11/2015 |
| JP | 2015212942 A | 11/2015 |
| KR | 20140119787 A | 10/2014 |

OTHER PUBLICATIONS

Invitation to Pay Additional Fees; Communication Relating to the Results of the Partial International Search; Provisional Opinion Accompanying the Partial Search Result dated Feb. 19, 2018, for International Application No. PCT/US2017/060554. 19 pages.
Japanese Office Action for Application No. JP2019-516482 dated Jul. 20, 2020.
Notice of Preliminary Rejection in KR Patent Application No. 10-2019-7013366, dated May 7, 2020 (with English Translation).
Notice of Allowance for Korean Patent Application No. 10-2019-7013366 dated Nov. 2, 2020.

* cited by examiner

USING MAP INFORMATION TO SMOOTH OBJECTS GENERATED FROM SENSOR DATA

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

These vehicles may rely on highly detailed maps of their environment. These maps are critical for both navigation, for instance determining how to get between two locations) as well as localization (determining where the vehicle is in the world).

In addition to maps, these vehicles are typically equipped with various types of sensors in order to detect objects in the surroundings. For example, autonomous vehicles may include lasers, sonar, radar, cameras, and other devices which scan and record data from the vehicle's surroundings. Sensor data from one or more of these devices may be used to detect objects and their respective characteristics (position, shape, heading, speed, etc.). These characteristics can be used to predict what an object is likely to do for some brief period into the future which can be used to control the vehicle in order to avoid these objects. Thus, detection, identification, and prediction are critical functions for the safe operation of autonomous vehicle.

BRIEF SUMMARY

Aspects of the disclosure provide method for generating a representation of an object detected by a perception system of a vehicle. The method includes receiving, by one or more processors, a set of data points from the perception system. The data points of the set of data points correspond to the object detected during a sweep of a laser of a laser sensor. The method also includes retrieving, by the one or more processors, map information identifying shapes and locations of lanes as well as locations of center points for the lanes; selecting, by the one or more processors, a representative point of the center points based on the set of data points; determining, by the one or more processors, a first position based on the location of the representative point; determining, by the one or more processors, a second position based on the set of data points; using, by the one or more processors, the first position and the second position in order to determine a third position for the representation of the object based on a distance the first position and the second position; generating, by the one or more processors, the representation of the object using the third position; and displaying, by the one or more processors, the representation of the object on a display of the vehicle.

In one example, the first position and the second position are used such that when the distance is a first distance, the first position has a first contribution to the third position, and when the distance is a second distance greater than the first distance, the second position has a second contribution to the third position that is greater than the first contribution. In another example, the map information further includes heading information identifying headings for the lanes, and the method also includes determining a first orientation based on the heading of the lane associated with the representative point; determining a second orientation based on the set of data points; and combining the first orientation and the second orientation in order to determine a third orientation for the representation of the object based on the distance, and wherein the representation for the object is generated using the third position. In this example, the first orientation and the second orientation are used such that when the distance is a first distance, the first orientation has a first contribution to the third orientation, and when the distance is a second distance greater than the first distance, the second orientation has a second contribution to the third position that is greater than the first contribution.

In another example, the method also includes determining a first width based on a width of the lane associated with the representative point; determining a second width based on the set of data points; and combining the first width and the second width in order to determine a third width for the representation of the object based on the distance, and wherein the representation for the object is generated using the third width. In this example, the first width and the second with are combined such that when the distance is a first distance, the first width has a first contribution to the third width, and when the distance is a second distance greater than the first distance, the second width has a second contribution to the third width that is greater than the first contribution.

In another example, the method also includes prior to receiving the set of data points, receiving an earlier set of data points corresponding to the object detected during a first sweep of the laser prior to the sweep of the laser, determining a length based on the earlier set of data points, and generating the representation of the object is further based on the length. In this example, the length is determined further based on an angular width of a side of the object corresponding to the length from a perspective of the laser. In addition or alternatively, the length is determined further based on whether the angular width is less than a minimum threshold angular width value.

Another aspect of the disclosure provides a system for generating a representation of an object detected by a perception system of a vehicle. The system includes one or more processors configured to receive a set of data points from the perception system. The data points of the set of data points correspond to the object detected during a sweep of a laser of a laser sensor. The one or more processors are also configured to retrieve map information identifying shapes and locations of lanes as well as locations of center points for the lanes; select a representative point of the center points based on the set of data points; determine a first position based on the location of the representative point; determine a second position based on the set of data points; use the first position and the second position in order to determine a third position for the representation of the object based on a distance the first position and the second position; generate the representation of the object using the third position; and display the representation of the object on a display of the vehicle.

In one example, the system also includes the vehicle. In another example, the first position and the second position are used such that when the distance is a first distance, the first position has a first contribution to the third position, and when the distance is a second distance greater than the first distance, the second position has a second contribution to the third position that is greater than the first contribution. In another example, the map information further includes heading information identifying headings for the lanes, and the one or more processors are also configured to determine a first orientation based on the heading of the lane associated with the representative point; determine a second orientation based on the set of data points; and combine the first orientation and the second orientation in order to determine a third orientation for the representation of the object based on the distance, and wherein the representation for the object is generated using the third position. In this example, the first orientation and the second orientation are used such that when the distance is a first distance, the first orientation has a first contribution to the third orientation, and when the distance is a second distance greater than the first distance, the second orientation has a second contribution to the third orientation that is greater than the first contribution.

In another example, the one or more processors are also configured to determine a first width based on a width of the lane associated with the representative point; determine a second width based on the set of data points; and combine the first width and the second width in order to determine a third width for the representation of the object based on the distance, and wherein the representation for the object is generated using the third width. In this example, the first width and the second with are combined such that when the distance is a first distance, the first width has a first contribution to the third width, and when the distance is a second distance greater than the first distance, the second width has a second contribution to the third width that is greater than the first contribution.

Another aspect of the disclosure provides a method for generating a representation of an object detected by a perception system of a vehicle. The method includes receiving, by one or more processors, a set of data points from the perception system, the data points of the set of data points corresponding to the object detected during a sweep of a laser of a laser sensor; determining a location of the object from the set of data points; accessing map information identifying center points of traffic lanes to identify a center point of a traffic lane that is closest to the location; determining a location for the representation of the object based on a distance between the identified center point and the location of the object; and displaying, by the one or more processors, the representation of the object on a display of the vehicle based on the location for the representation of the object.

In one example, the map information further includes heading information identifying headings for the lanes, and the method also includes determining an orientation of the object based on the set of data points and determining an orientation for the representation of the object based on the orientation of the object and the distance between the identified center point and the location of the object. In this example, displaying the representation is further based on the orientation for the representation.

In another example, the method also includes determining a width of the object based on the set of data points and determining a width for the representation of the object based on the width of the object and the distance between the identified center point and the location of the object. In this example, displaying the representation is further based on the width for the representation.

DETAILED DESCRIPTION

Overview

Figure 1:
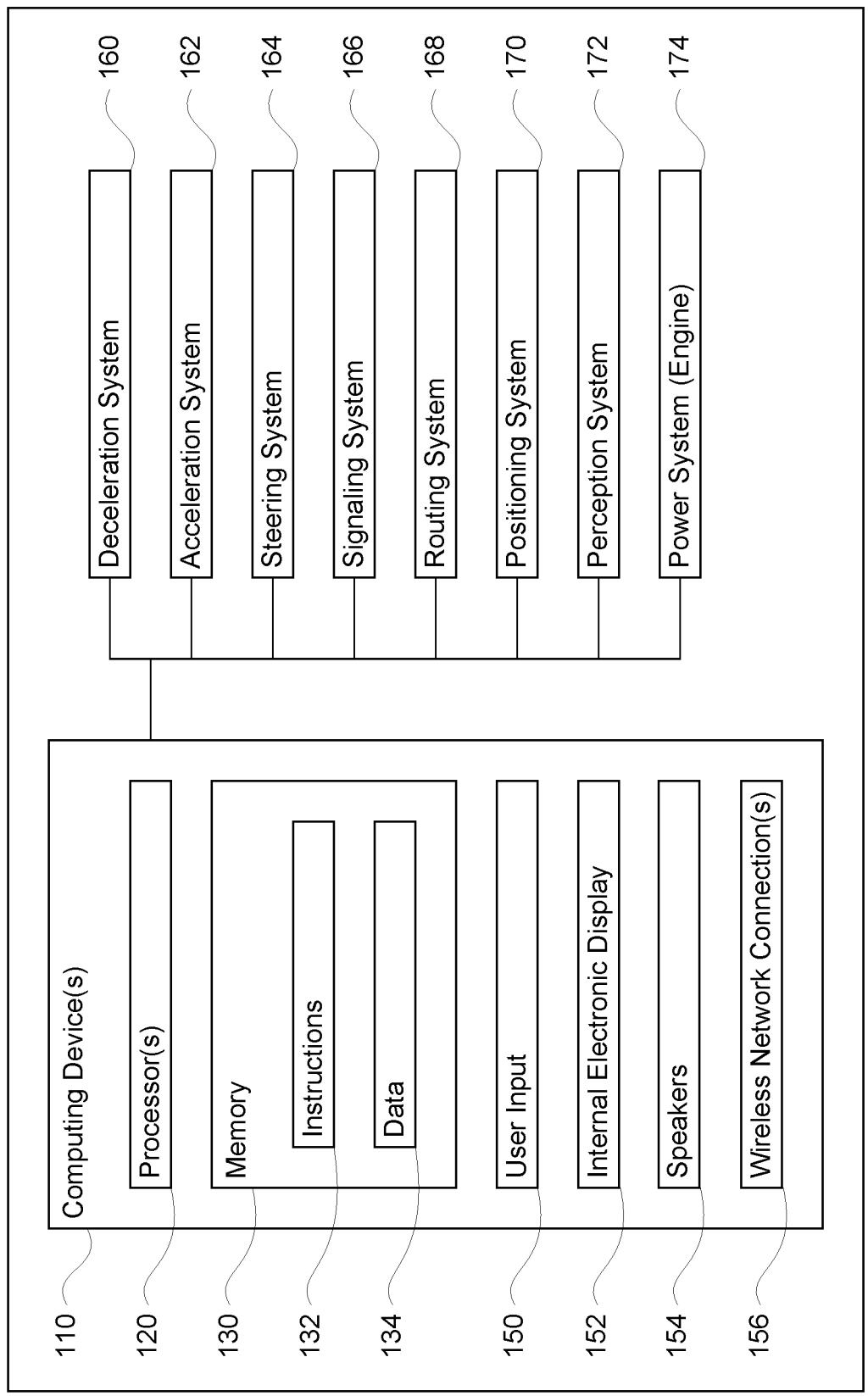
FIG. 1 is a functional diagram of an example vehicle in accordance with aspects of the disclosure.

The technology relates to generating visual representations of objects detected in a vehicle's environment using sensor data collected in real time. As noted above, in addition to detection, identification, and prediction, providing information to passengers about what objects have been detected by the vehicle's sensors is an important way to keep the passenger information about the functionality of the vehicle's sensors as well as maintaining a feeling of safety for the passenger. For instance, when using data point clouds generated by a laser of a LIDAR systems to generate representations of objects over time, the representations can appear to be "jumpy." As an example, a single set of data points may correspond to a single sweeps of the laser across the object. This set of data points may be used to generate a representation of an object for display, such as a rectangle having a size, shape and orientation corresponding to values determined from the set of data points. Over time, the representation is updated by generating new representations from new sets of data points generated from new sweeps of the laser. However, when sensor data is used to generate representations of objects in real time, the more "true" to the sensor data, the more unrealistic the representations can be. In other words, rather than depicting static or smoothly-moving objects, the representations appear to rotate and shift slightly due to the way that the points in the data point clouds are not continuously located in the same place over time. This may be because the object, the laser of the LIDAR system, and/or the vehicle are moving as the laser sweeps across the area where the object is located. This shifting and rotating can thus affect the position, heading, and shape/size of an object, even when the object itself is completely static or moving at a steady speed in a particular direction. Because objects such as vehicles, pedestrians, and bicyclists do not actually move in this way, it can be disconcerting to a passenger to view such representations.

Typical smoothing techniques such as low-pass filters can reduce the shifting and rotating may also make objects move in unrealistic ways. For instance, such filters can results in an object moving with an incorrect heading, an overly large size or shape, or even an incorrect position. In addition, performing such smoothing techniques on the data points and then using the smoothed data to control the vehicle can actually be dangerous to the vehicle, passengers, and other objects as the data becomes less accurate.

In order to create a more realistic representation of an object using laser data, the representations of objects can be smoothed to reduce the aforementioned shifting and rotating using pre-stored map information. By using the map information to smooth data points prior to generating a representation of an object, but not using this smoothed data to control the vehicle, the shifting and rotating of the representation can be reduced without jeopardizing the safety of the vehicle, passengers, or other objects.

For example, a set of data points corresponding to object may be received by the vehicle's computing devices from the perception system. The map information may be used to identify a reference point or line for a set of data points. The proximity of the data points for an object to the reference point may be used to smooth the data points prior to generating a representation of an object.

In one example, the computing devices may identify a center point (or line) of the map information that is closest to the set of data points for a given object. If the object is in or near a lane, the closest center point may be a center point within the lane. If the object is in or near a parking spot, the closest center point may be a center point within the parking spot.

This closest center point may then become a reference point for smoothing the set of data points. The reference point and the associated lane (or parking spot) information identified in the map information may be used to adjust the characteristics of a representation generated by the set of data points. In addition, the closer the average location is to the reference point, the greater the adjustment may be. This may make different representations generated for the same object over time appear to move much more smoothly.

The width of the lane or parking spot at the reference point may be used to determine the representation's width. As an example, a first width may be set to the actual width of the lane (or parking spot) at the location of the center point, an average width of the lane (or parking spot), or an average width or default width value for lanes (or parking spots).

The first width may be combined with a second width of the object determined from the set of data points. For instance, this second width may be a widest width of the object from the perspective of the laser. The first width and the second width can be combined together based on the proximity of the average location to the representative point. In this regard, when the average location is equal to the representative point, the first width may be set at the width of the representation. When the average location is farther from the representative point, the second width may have more of an influence on the width, until the average location is so far from the representative point that the second width is set as the width of the representation. This can reduce or prevent shifts in size between generated representations for the same object.

The orientation of the representation can be determined using the map information. A first orientation can be determined from the heading of the lane associated with the reference point. A second orientation can be determined from the set of data points. As with the width example, the first orientation and the second orientation can be combined together based on angular difference between the first orientation and the second orientation. In this regard, when the first orientation is equal to the second orientation, the first orientation may be set at the orientation of the representation. When the average location is farther from the representative point, the second orientation may have more of an influence on the orientation, until the average location is so far from the representative point that the second orientation is set as the orientation of the representation. This can reduce or prevent large rotations between generated representations for the same object.

The position of the representation can be determined using the map information. A first position can be the position of the reference point. A second position can be the average location. As with the width and orientation examples, the first position and the second position can be combined together to determine a position of the representation based on the proximity of the average location to the representative point. In this regard, when the average location is equal to the representative point, the first position may be set at the position of the representation. When the average location is farther from the representative point, the second position may have more of an influence on the position, until the average location is so far from the representative point that the second position is set as the position of the representation. This can reduce or prevent large lateral shifts between generated representations for the same object.

The features described herein allow the vehicle's computing system to generate realistic representations of objects in real time. By generating the width, orientation and position of the representation based on the proximity of a detected object to a center of a lane or parking spot, the techniques described above create a smooth continuum of movement for representations generated over time from different sets of data points and prevents the computing devices from having the data points or map information from having too much of an influence on a representation. Moreover, by limiting the smoothing to the representation generation, this allows the computing devices to control the vehicle with the most accurate information possible.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be an autonomous driving computing system incorporated into vehicle 100. The autonomous driving computing system may capable of communicating with various components of the vehicle. For example, returning to FIG. 1, computing devices 110 may be in communication with various systems of vehicle 100, such as deceleration system 160, acceleration system 162, steering system 164, signaling system 166, routing system 168, positioning system 170, perception system 172, and power system 174 (for instance, a gas or electric engine) in order to control the movement, speed, etc. of vehicle 100 in accordance with the instructions 132 of memory 130. Again, although these systems are shown as external to computing devices 110, in actuality, these systems may also be incorporated into computing devices 110, again as an autonomous driving computing system for controlling vehicle 100.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. Signaling system 166 may be used by computing devices 110 in order to signal the vehicle's intent to other drivers or vehicles, for example, by lighting turn signals or brake lights when needed.

Routing system 168 may be used by computing devices 110 in order to determine and follow a route to a location. In this regard, the routing system 168 and/or data 134 may store detailed map information, e.g., highly detailed maps identifying the shape and elevation of roadways, lane lines, lanes and heading information (identifying the headings or orientations of the lanes), intersections, crosswalks, speed limits, traffic signals, buildings, signs, real time traffic information, vegetation, or other such objects and information. In other words, this detailed map information may define the geometry of vehicle's expected environment including roadways as well as speed restrictions (legal speed limits) for those roadways. In addition, this map information may include information regarding traffic controls, such as traffic signal lights, stop signs, yield signs, etc., which, in conjunction with real time information received from the perception system 172, can be used by the computing devices 110 to determine which directions of traffic have the right of way at a given location.

Figure 2A:
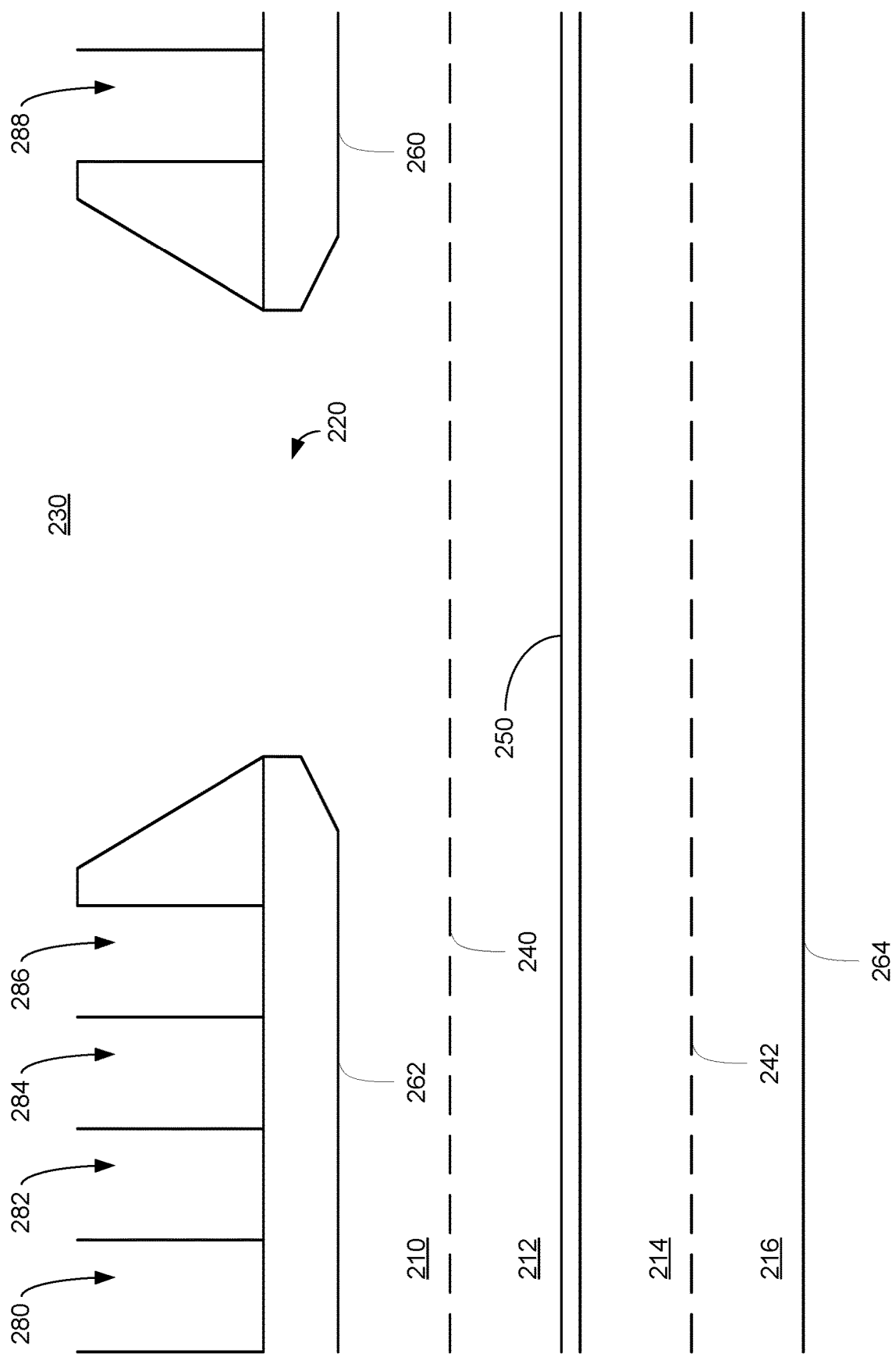
FIGS. 2A-2B are diagrams of map information in accordance with aspects of the disclosure.
Figure 2B:
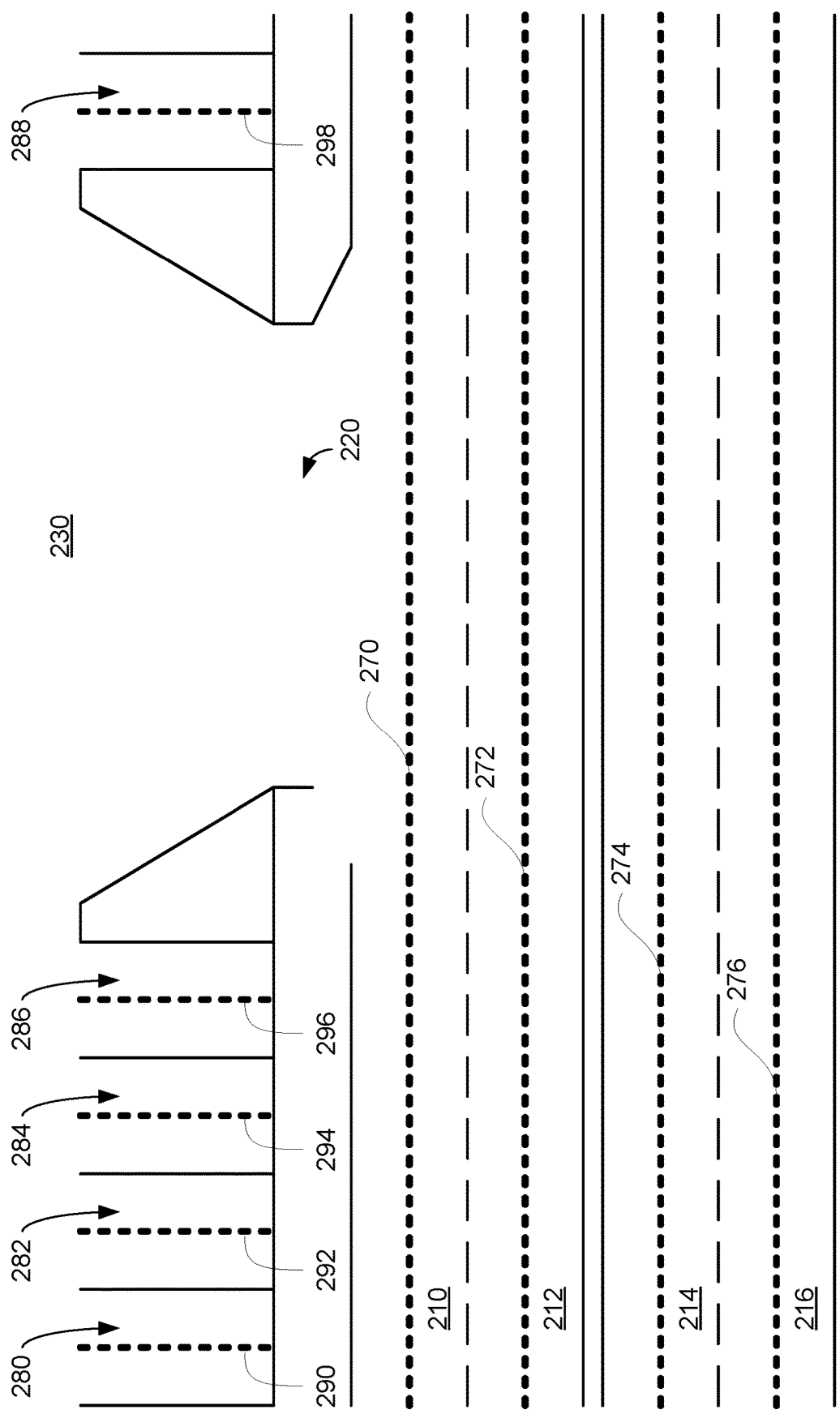
Figure 3A:
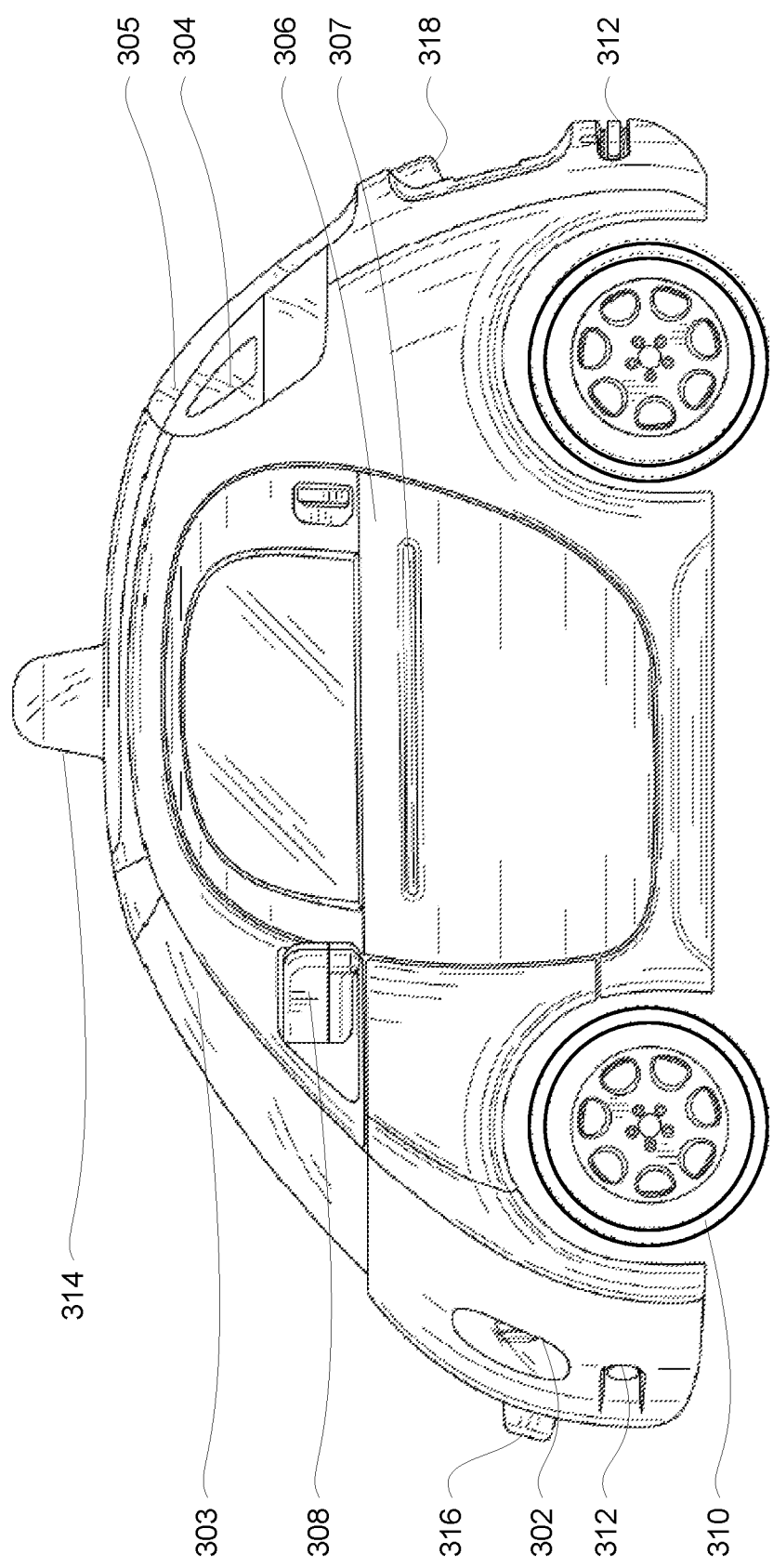
FIGS. 3A-3D are example external views of a vehicle in accordance with aspects of the disclosure.
Figure 3C:
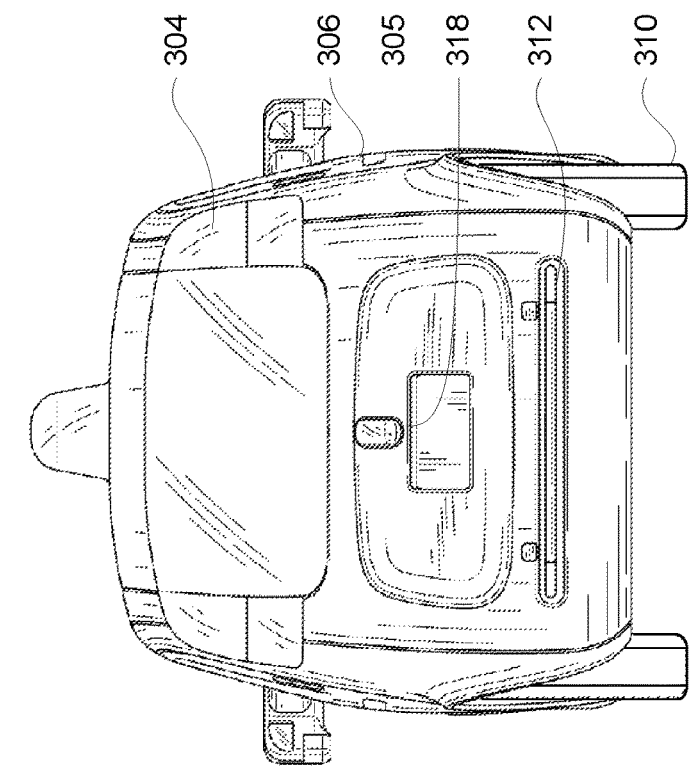
Figure 3B:
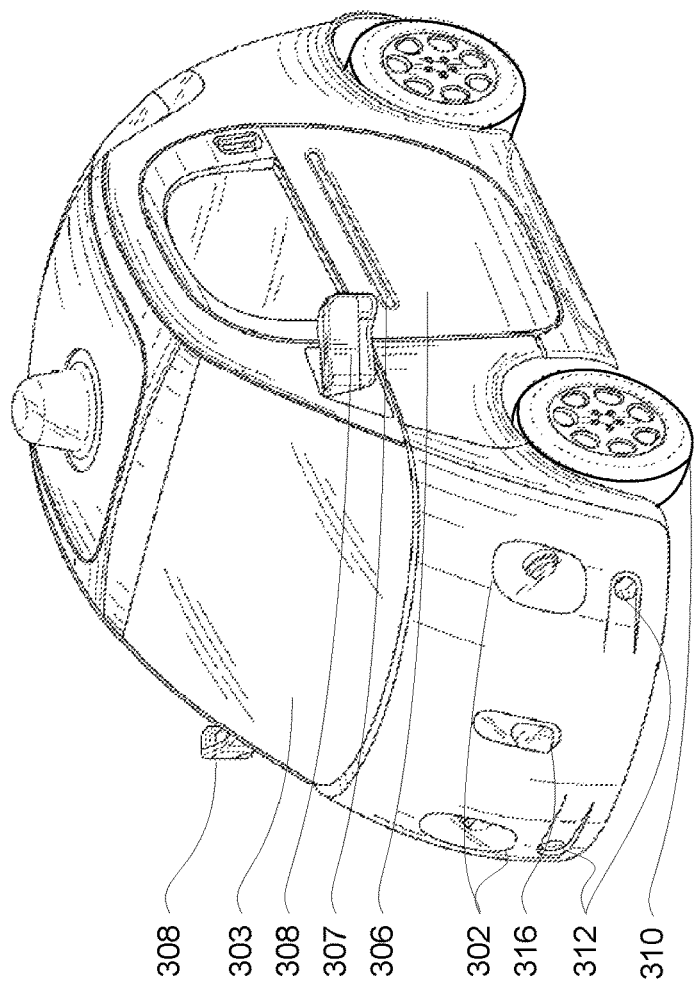
Figure 3D:
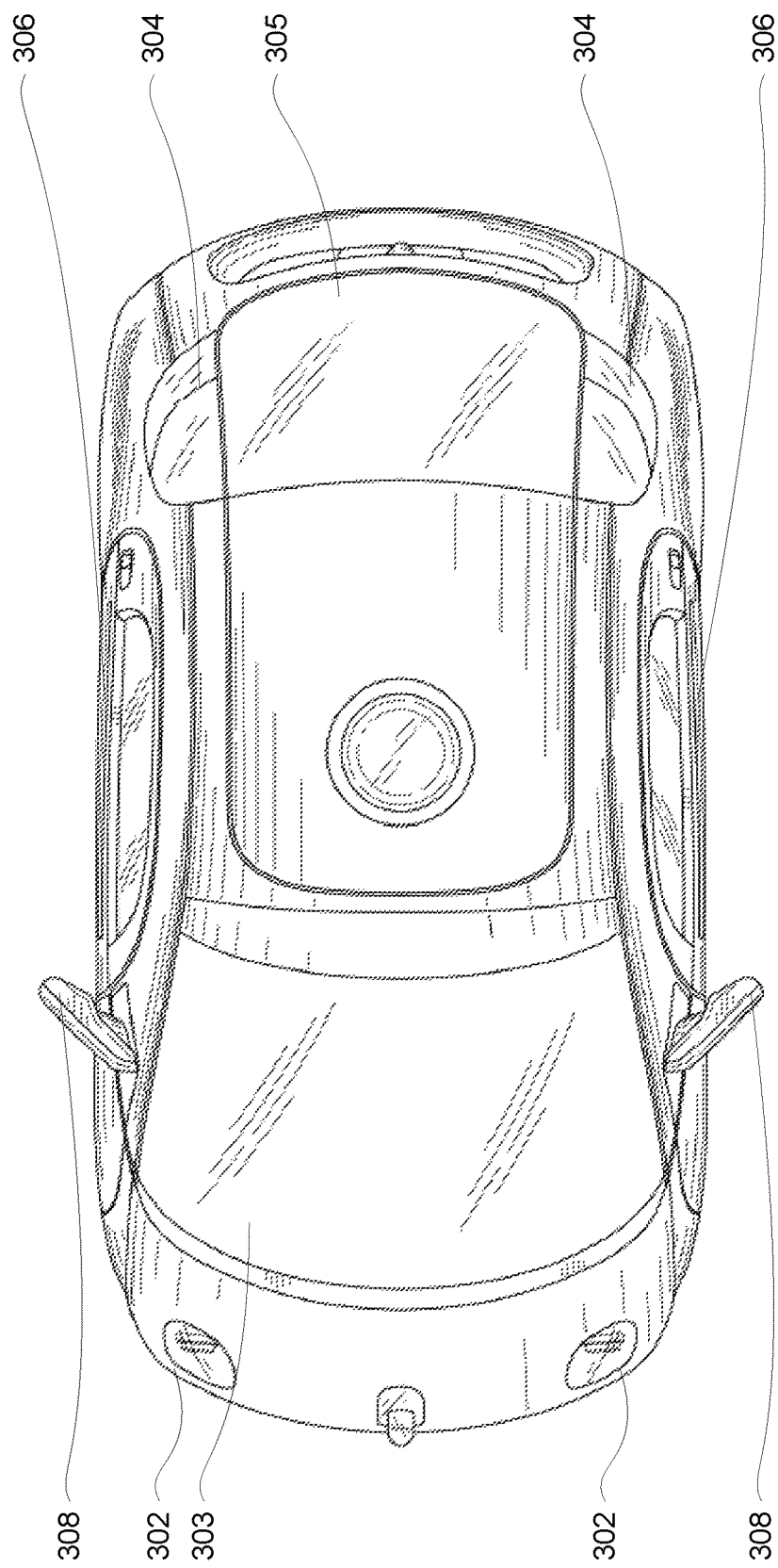

FIGS. 2A and 2B are an example of map information for a section of roadway including lanes 210, 212, 214, 216, as well as entrance/exit area 220 for a parking lot 230. Referring to FIG. 2A, the map information that includes information identifying the shape, location, and other characteristics of lane marks or lane lines 240, 242, median area 250 (dividing the different directions of traffic between lanes 210, 212 and lanes 214, 216), and curbs 260, 262, 264. In some instances, the map information may even include information identifying the shape and size of parking spots, such as parking spots 280, 282, 284, 286, 288. In addition to the features shown in FIG. 2A, as shown in FIG. 2B, the map information may also include information a center point or center line 270, 272, 274, 276 (made up of many points) for each of the lanes 210, 212, 214, 216, respectively. As with the lanes, each of the parking spots 280, 282, 284, 286, 288 may be associated with information identifying a center point or line 290, 292, 294, 296, 298.

Although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

The perception system 172 also includes one or more components for detecting objects external to the vehicle such as other vehicles, obstacles in the roadway, traffic signals, signs, trees, etc. For example, the perception system 172 may include sensors such as LIDAR (lasers), sonar, radar, cameras and/or any other detection devices that record data which may be processed by computing devices 110. In the case where the vehicle is a small passenger vehicle such as a car, the car may include a laser or other sensors mounted on the roof or other convenient location. For instance, a vehicle's perception system may use the various sensors to detect objects and their characteristics such as location, orientation, size, shape, type, direction and speed of movement, etc. The raw data from the sensors and/or the aforementioned characteristics can be quantified or arranged into a descriptive function or vector for processing by the computing devices 110. As discussed in further detail below, computing devices 110 may use the positioning system 170 to determine the vehicle's location and perception system 172 to detect and respond to objects when needed to reach the location safely.

FIGS. 3A-3D are examples of external views of vehicle 100. As can be seen, vehicle 100 includes many features of a typical vehicle such as headlights 302, windshield 303, taillights/turn signal lights 304, rear windshield 305, doors 306, side view mirrors 308, tires and wheels 310, and turn signal/parking lights 312. Headlights 302, taillights/turn signal lights 304, and turn signal/parking lights 312 may be associated with the signaling system 166. Light bar 307 may also be associated with the signaling system 166.

Vehicle 100 also includes sensors of the perception system 172. For example, housing 314 may include one or more laser devices having 360 degree or narrower fields of view and one or more camera devices. Housings 316 and 318 may include, for example, one or more radar and/or sonar devices. The devices of the perception system 172 may also be incorporated into the typical vehicle components, such as taillights/turn signal lights 304 and/or side view mirrors 308. Each of these radar, camera, and lasers devices may be associated with processing components which process data from these devices as part of the perception system 172 and provide sensor data to the computing devices 110.

Data 134 may store various behavior-time models for predicting an object's future behavior for a pre-determined period of time, such as the next 10 seconds or more or less. In one example, the behavior-time models may be configured to use data for an object received from the perception system 172, and in particular another road user, including the road user's characteristics as well as additional contextual information discussed in further detail below. As an example, given the location, heading, speed, and other characteristics included in the data from the perception system 172, the behavior-time models may provide a set of one or more predictions for how the object could behave for the predetermined period of time as well as a corresponding likelihood value for each prediction. The predictions may include a trajectory, for instance, defining a set of future locations where the object is expected to be at various times in the future corresponding to the predetermined period of time. The likelihood values may indicate which of the predictions are more likely to occur (relative to one another). In this regard, the prediction with the greatest likelihood value may be the most likely to occur whereas predictions with lower likelihood values may be less likely to occur.

Thus, the behavior-time models may be configured to generate a set of possible hypotheses for what a particular road user will do over a particular horizon or predetermined period of time (e.g. 10 seconds) and relative likelihoods for each hypothesis. These models may be trained using data about how an object observed at that location behaved in the past, intuition, etc., and may also be specifically designated for particular types of objects, such as vehicles, pedestrians, motorcycles, bicyclists, etc. The computing devices 110 can then reason about hypotheses that interact with the vehicle's trajectory and are of a sufficient likelihood to be worth considering.

The computing devices 110 may control the direction and speed of the vehicle by controlling various components. By way of example, computing devices 110 may navigate the vehicle to a destination location completely autonomously using data from the detailed map information, perception system 172, and routing system 168. In order to maneuver the vehicle, computing devices 110 may cause the vehicle to accelerate (e.g., by increasing fuel or other energy provided to the power system 174 or engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
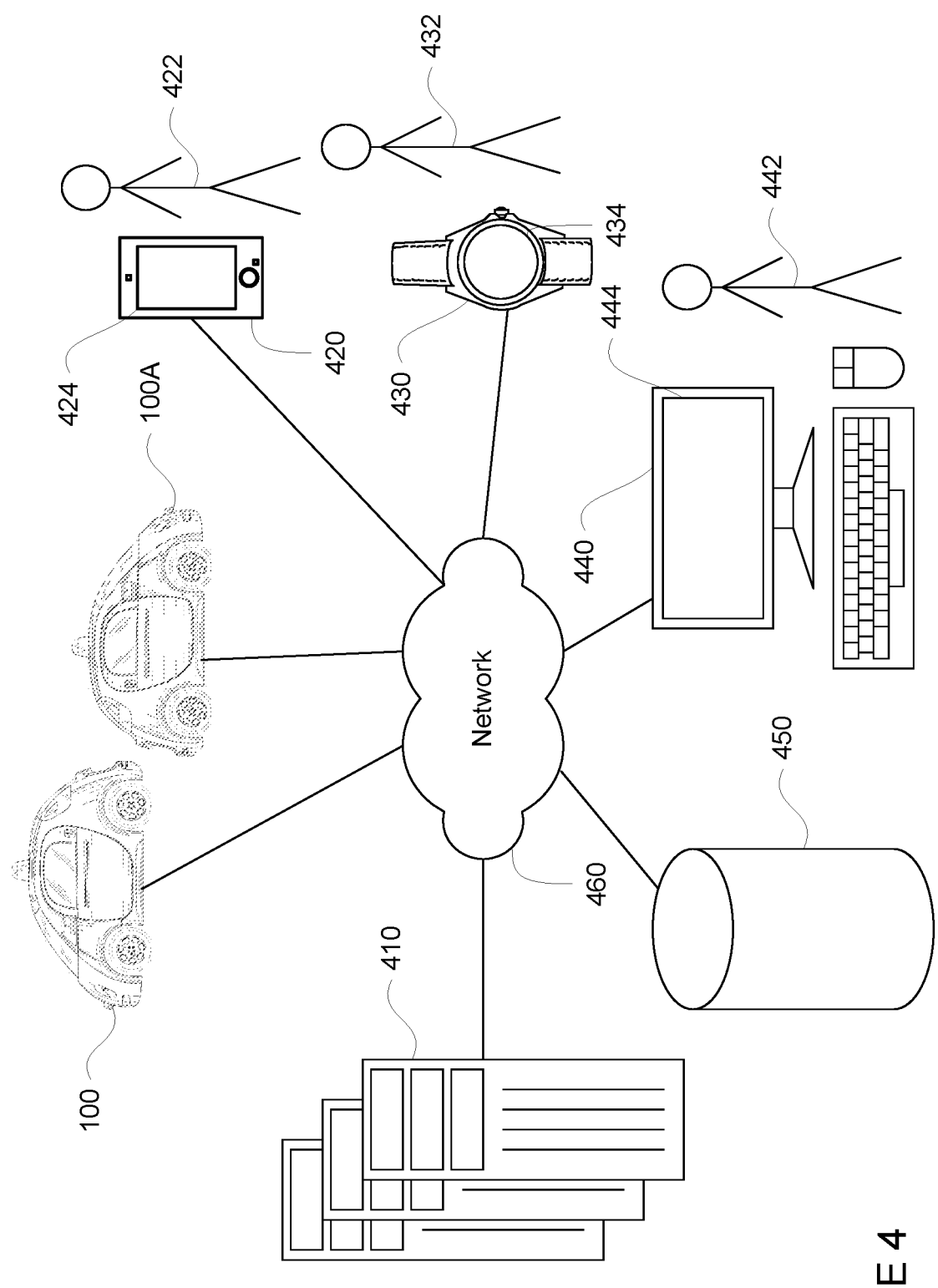
FIG. 4 is a pictorial diagram of a system in accordance with aspects of the disclosure.
Figure 5:
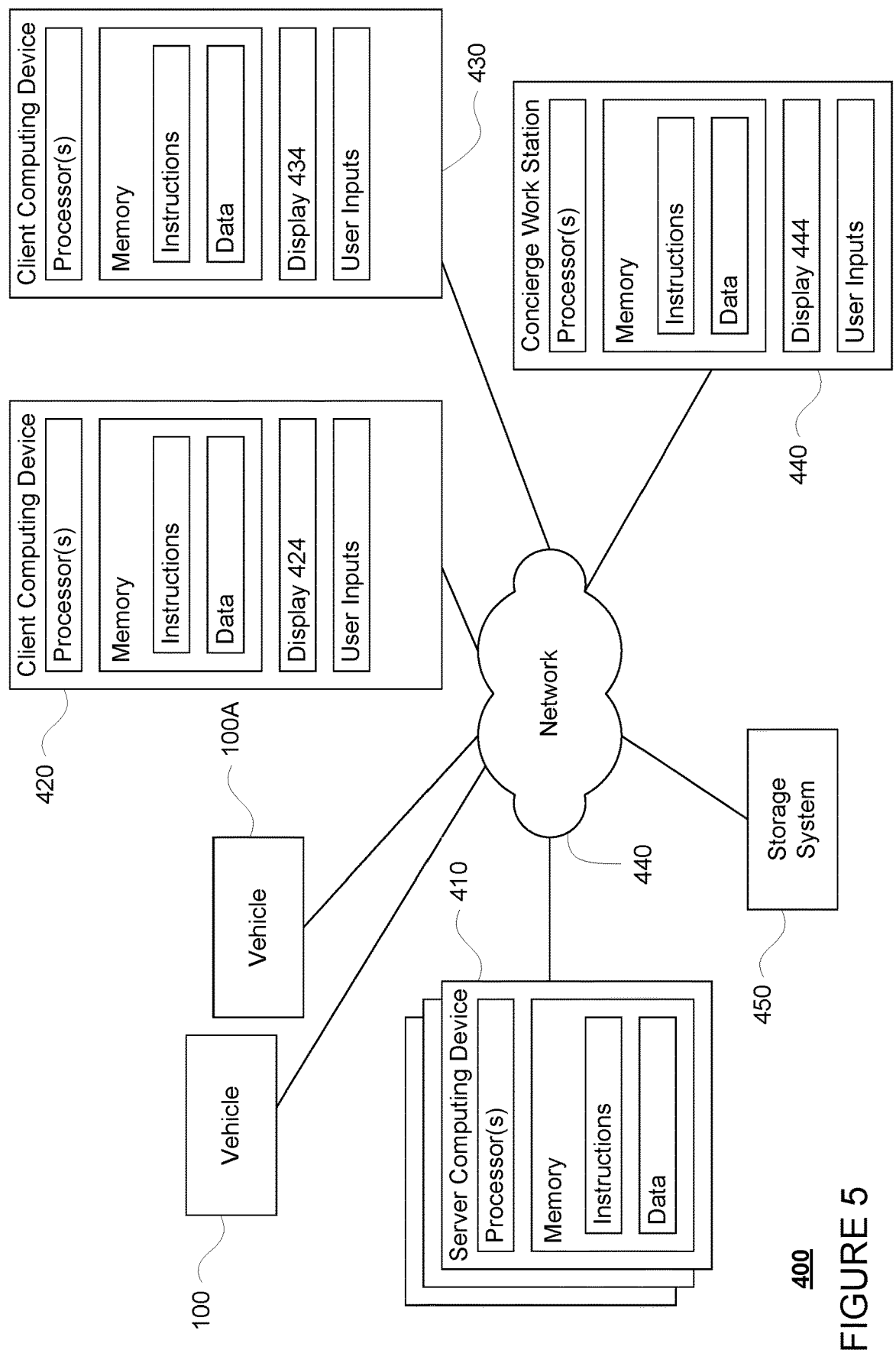
FIG. 5 is a functional diagram of the system of FIG. 4 in accordance with aspects of the disclosure.

The one or more computing devices 110 of vehicle 100 may also receive or transfer information to and from other computing devices. FIGS. 4 and 5 are pictorial and functional diagrams, respectively, of an example system 400 that includes a plurality of computing devices 410, 420, 430, 440 and a storage system 450 connected via a network 460.

System 400 also includes vehicle 100, and vehicle 100A which may be configured similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 134, and instructions 132 of computing devices 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include a server having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with one or more computing devices 110 of vehicle 100 or a similar computing device of vehicle 100A as well as client computing devices 420, 430, 440 via the network 460. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices (e.g., a mouse, keyboard, touch-screen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, laptop, or a netbook that is capable of obtaining information via the Internet or other networks. In another example, client computing device 430 may be a wearable computing device, such as a "smart watch" as shown in FIG. 4. As an example the user may input information using a keyboard, a keypad, a multi-function input button, a microphone, visual signals (for instance, hand or other gestures) with a camera or other sensors, a touch screen, etc.

In some examples, client computing device 440 may be a concierge work station used by an administrator to provide concierge services to users such as users 422 and 432. For example, user 442 may be a concierge that uses concierge work station 440 to communicate via a telephone call or audio connection with users through their respective client computing devices or vehicles 100 or 100A in order to ensure the safe operation of vehicles 100 and 100A and the safety of the users as described in further detail below. Although only a single concierge work station 440 is shown in FIGS. 4 and 5, any number of such work stations may be included in a typical system.

Storage system 450 may store various types of information. This information may be retrieved or otherwise accessed by a server computing device, such as one or more server computing devices 410, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more unique signals for the user.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIG. 4 and/or may be directly connected to or incorporated into any of the computing devices 110, 410, 420, 430, 440, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 422 and 432 may download the application via a link in an email, directly from a website, or an application store to client computing devices 420 and 430. For example, client computing device may transmit a request for the application over the network, for example, to one or more server computing devices 410, and in response, receive the application. The application may be installed locally at the client computing device.

The user may then use his or her client computing device to access the application and request a vehicle. As an example, a user such as user 432 may use client computing device 430 to send a request to one or more server computing devices 410 for a vehicle. The request may include information identifying a pickup location or area and/or a destination location or area. In response the one or more server computing devices 410 may identify and dispatch, for example based on availability and location, a vehicle to the pickup location. This dispatching may involve sending information to the vehicle identifying the user (and/or the user's client device) in order to assign the vehicle to the user (and/or the user's client computing device), the pickup location, and the destination location or area.

Once the vehicle 100 receives the information dispatching the vehicle, the vehicle's one or more computing devices 110 may maneuver the vehicle to the pickup location using the various features described above. Once the user, now passenger, is safely in the vehicle, the computing devices 110 may initiate the necessary systems to control the vehicle autonomously along a route to the destination location. For instance, the routing system 168 may use the map information of data 134 to determine a path or route to the destination location that follows a set of the lane segments of map information. The computing devices 110 may then maneuver the vehicle autonomously (or in an autonomous driving mode) as described above along the route towards the destination.

Figure 6:
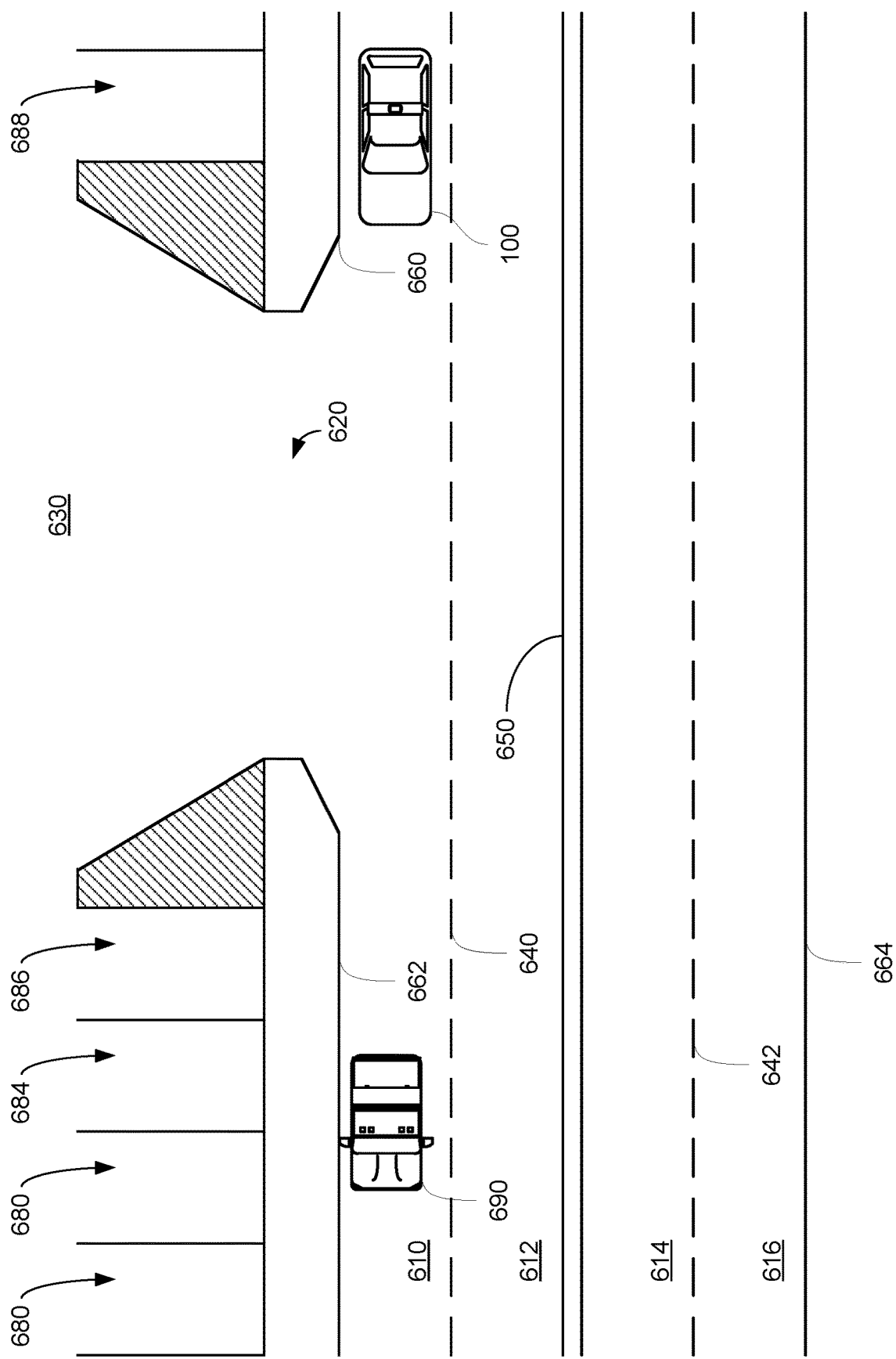
FIG. 6 is a view of a section of roadway in accordance with aspects of the disclosure.

FIG. 6 is an example view of a section of roadway corresponding to the section of roadway defined in the map information of FIGS. 2A and 2B. For instance, FIG. 6 includes lanes 610, 612, 614, 616 corresponding to lanes 210, 212, 214, 216, as well as entrance/exit area 620 for a parking lot 630 corresponding to entrance/exit area 220 for parking lot 230. FIG. 6 also includes lane lines 640, 642 corresponding to lane lines 240, 242, median area 650 corresponding to median area 250, and curbs 660, 662, 664 corresponding to curbs 260, 262, 264. In this example, vehicle 100 is traveling in lane 610 an approaching entrance/exit area 620 of parking lot 630.

Figure 7:
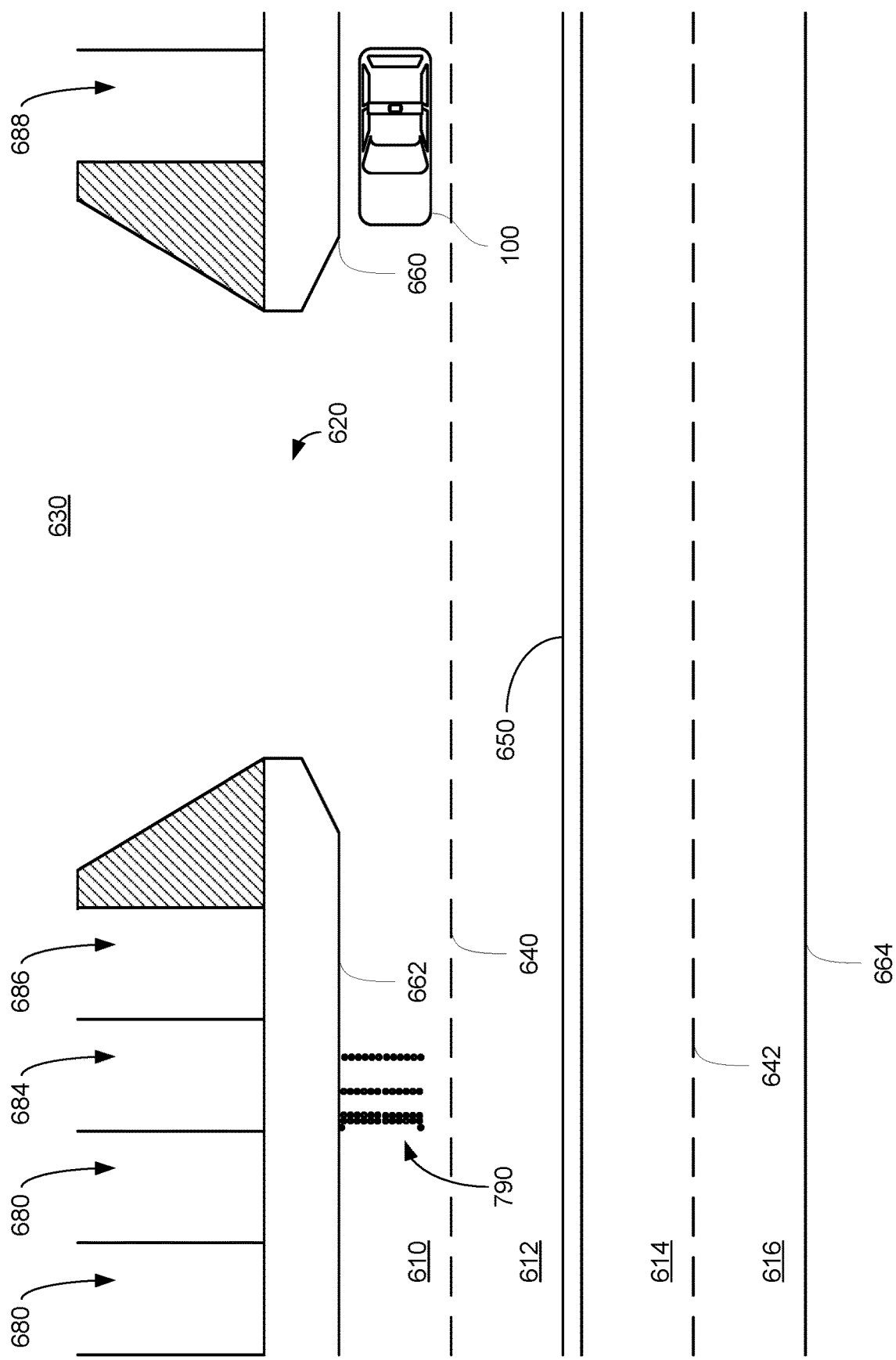
FIG. 7 is a view of a section of roadway and data in accordance with aspects of the disclosure.

As the vehicle is driven as discussed above, the perception system provides the vehicle's computing devices with information regarding objects detected in the vehicle's environment. In this regard, a set of data points corresponding to object may be received by the vehicle's computing devices from the perception system. For instance, as vehicle 100 approaches vehicle 690, the perception system 172 may, by way of its sensors, generate information about the area around vehicle 100 including the vehicle 690. With regard to vehicle 690, this information may include, for instance, vehicle 690's location, orientation, speed, shape, etc. This information may be received as discrete values and/or raw sensor data that identifies the shape and locations objects detected by the perception system 172. Turning to FIG. 7, as an example, the perception system 172 may provide the computing devices 110 with laser data 790 (here overlaid on the example of FIG. 6) including location and intensity information corresponding to the portions of vehicle 690 detected by the perception system 172 during a single scan or sweep of a laser of the perception system. As an example, a single scan may correspond to one pass through the laser's field of view).

Figure 8:
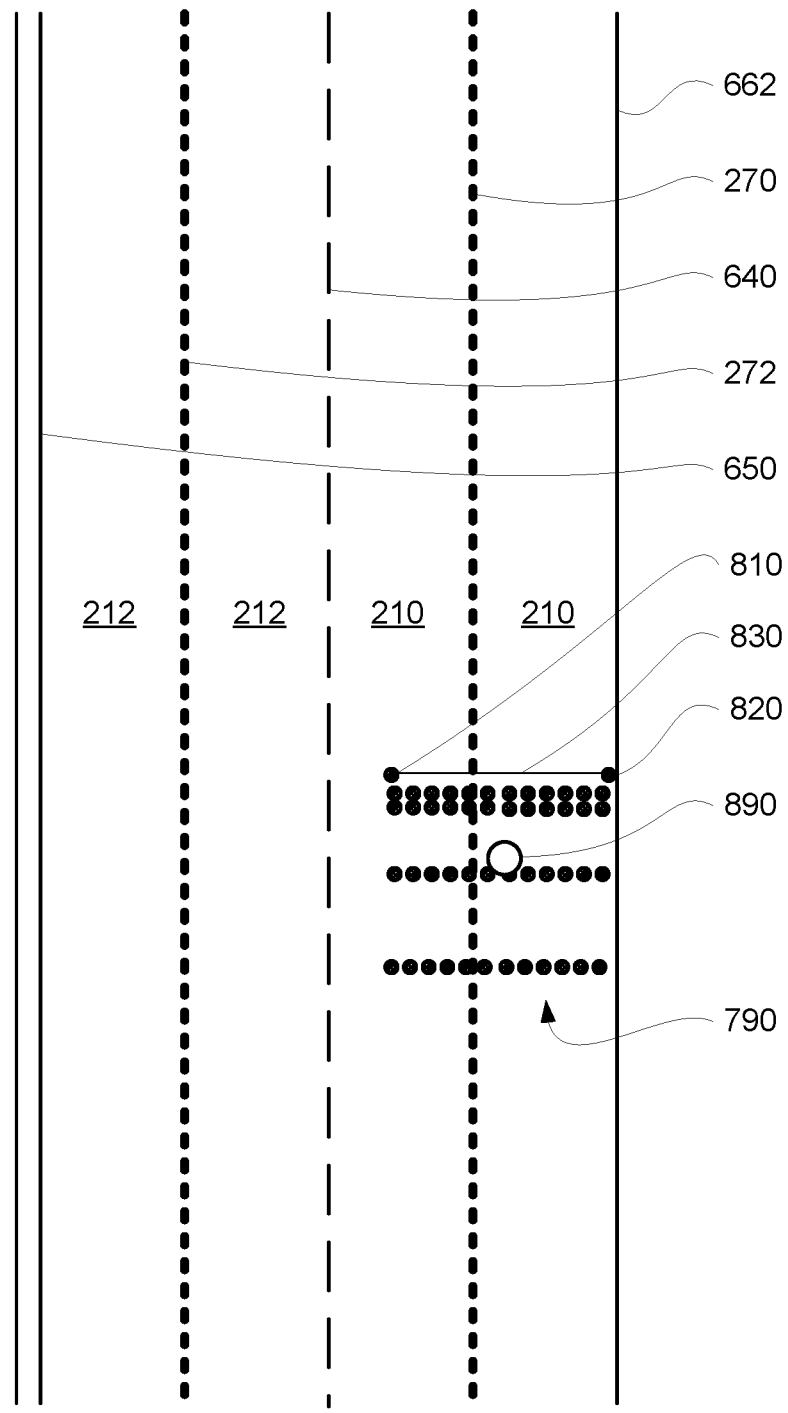
FIG. 8 is a view of a section of roadway and data in accordance with aspects of the disclosure.

Using the received data, the computing devices may identify a center point (or line) of a lane of the map information that is closest to the set of data points for a given object. As an example, the computing devices 110 may retrieve map information identifying shapes and locations of lanes as well as locations of center points for the lanes in an area around the vehicle. The locations of the sets of data points may be averaged together and this average location used to identify a closest center point for the lane (or parking spot). If the object is in or near a lane, the closest center point may be a center point within the lane. For instance, FIG. 8 is a detail view of a portion of the map information that includes data 790 as well as portions of lane 210 and lane 212 (corresponding to lane 610 and 612 of FIG. 6). In addition, FIG. 8 includes an overlay of center line 270 (of lane 210) and center line 272 (of lane 212). Here, circle 890 represents an average or estimated location of the object corresponding to data 790 (here, vehicle 690). As can be see, circle 890 is closest to center line 270 than any other center line of the map information. Referring to FIG. 8, which is a detail view of a portion of FIG. 8 (without the data 790), reference line 910 represents the shortest distance between circle 890 and center line 272, thus point 920 represents a center point on center line 270 that is closest the location of circle 890. Of course, if the object is in or near a parking spot, the closest center point may be a center point on a center line within the parking spot.

This closest center point may then become a reference point for the set of data points that will be used to generate a representation. In that regard, point 920 represents a location of a reference point for smoothing data 790.

As noted above, the reference point and the associated lane (or parking spot) information identified in the map information may be used to generate characteristics of a representation, such as width, orientation and position, by adjusting the characteristics of the set of data points. In addition, the closer the average location is to the reference point, the greater the adjustment or influence the reference point may have on the characteristics of the representation. Thus, the adjustment may be made based on the distance between the locations represented by circle 890 and point 920, or the length of reference line 910. This may make different representations generated for the same object over time appear to move much more smoothly.

Figure 10:
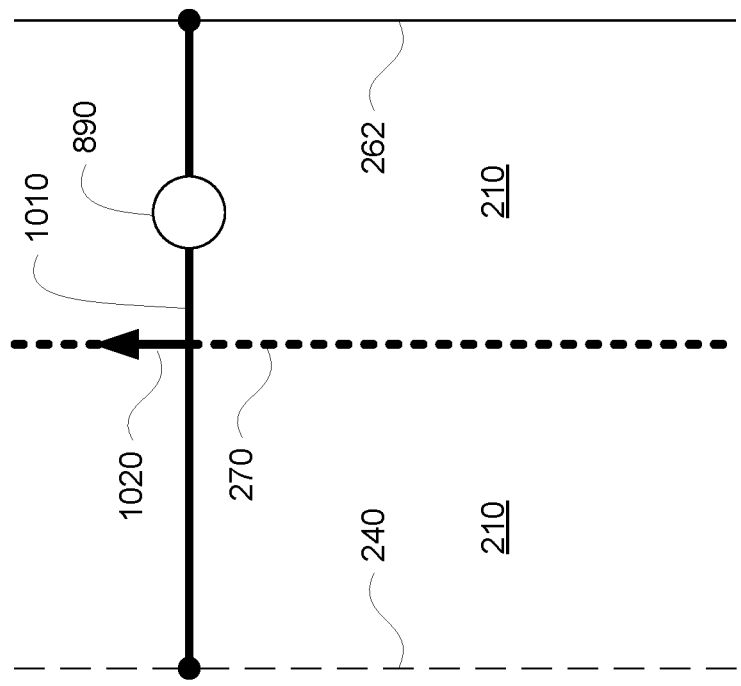
FIG. 10 is a view of a section of roadway and data in accordance with aspects of the disclosure.
Figure 9:
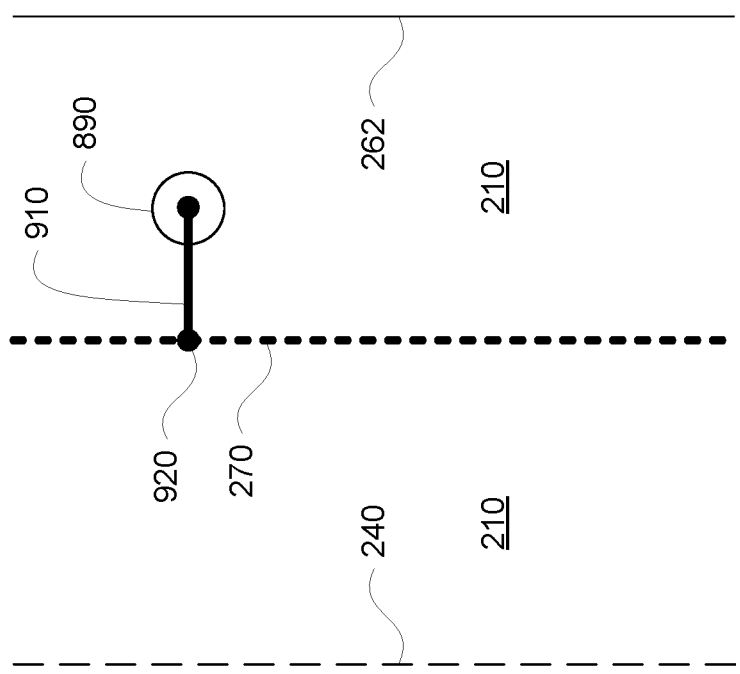
FIG. 9 is a view of a section of roadway and data in accordance with aspects of the disclosure.

The width of the lane or parking spot at the reference point may be used to determine a width for the representation. In this regard, the computing devices may make an assumption that the object is narrower in width across a lane than the width of the lane. As an example, a first width may be set to the actual width of the lane (or parking spot) at the location of the center point, an average width of the lane (or parking spot), or an average width or default width value for lanes (or parking spots) less 1 meter (or more or less). Referring to FIG. 10, the width of lane 210 may be determined by taking the distance between curb 262 and the lane line 280, corresponding to the length of reference line 1010. Thus, the length of reference line 1010 may be the first width. This distance may be determined in real time or retrieved from the detailed map information (if available).

A second width of the object may be determined from the set of data points. For instance, this second width may be a widest width of the object from the perspective of the sensor, for instance LIDAR or laser, of the vehicle's perception system that generates the set of data points. Referring to FIG. 8, the width of data 790 may correspond to the distance between data point 810 and data point 820, or the length of reference line 830, as this would be the greatest distance between the data points from the perspective of the laser of vehicle 100 (see FIG. 7). Thus, this distance would be the second width.

The second width can be "adjusted" to determine a width of the representation by combining the first and second widths together based on the proximity of the average location to the representative point. As an example, the first and second widths may be combined together using a mix amount based on the distance between the average location and the representative point and a maximum distance value. The following is an example equation for determining a mix amount: mix_amount=distance_to_representative_point/maximum distance value, where distance_to_representative_point is the distance between the average location and the representative point. The maximum_distance_value or maximum distance value may correspond to a value that represents half of the actual width of the lane (or parking spot) at the location of the center point, half an average width of the lane (or parking spot), or half an average width or default width value for lanes (or parking spots) less 1 meter (or more or less).

As noted above, the mix amount, first width and second width may be used to determine a width of the representation. The following is an example equation for determining the width of the representation: width_of_the_representation=first_width*(1−mix_amount)+second_width*mix_amount, where first_width is the first width and the second_width is the second width. In this regard, when the average location is equal to the representative point (the length of reference line 910 is zero), the width of the representation will be the first width. As the distance between the average location and the representative point increases, the mix value increases, thereby increasing the influence of the second width on the width of the representation until the distance to the representative point is equal to the maximum distance value, and the representative width is set to the second width. In this regard, a 50% contribution from each of the first width and second width would be set as the width of the representation when the distance to the representative point is half of the maximum distance value. If the distance to the representative point is greater than the maximum distance value, as discussed below, a different, closer representative point for a different lane may be used to determine the width of the representation or the width of the representation may simply be set to the second width.

Referring to the example of FIG. 10, the width of the representation would be set to the length of reference line 830. When the average location is farther from the representative point (the length of the reference line 910 is greater than zero), the second width may have more of an influence on the width of the representation. When the average location is so far from the representative point (the length of the reference line 910 is or is close to the maximum distance value), the second width is set as the width of the representation. In this regard, as the location of circle 890 moves away from the center line 270, the length of the reference line 1010 would have a greater influence on the combination of the widths and thus the width of the representation. When the location of circle 890 is the maximum distance value from the representative point, the combination of the first width and second width would result in the second width, or the length of reference line 1010. Thus, the length of reference line 1010 would be set as the width of the representation. Setting the width of the representation in this way can reduce or prevent shifts in size between generated representations for the same object.

An orientation for the representation can be determined using the map information, and specifically, the heading of the lane of the reference point. As an example, a first orientation can be determined from the heading of the lane associated with the reference point. Referring to FIG. 10, arrow 1020 represents the orientation of lane 210 as included in the detailed map information, and thus, corresponds to the orientation of lane 610. A second orientation can be determined by observing sets of points for the same object over a brief period of time or by analyzing camera images of the object.

As with the width example, second orientation can be "adjusted" to determine an orientation of the representation by combining the first and second orientations together based on the proximity of the average location to the representative point, or rather in the example above, the length of reference line 910. As an example, the first and second orientations may be combined together using the mix amount based on the distance between the average location and the representative point and a maximum distance value. Again, the following is an example equation for determining a mix amount: mix_amount=distance_to_representative_point/maximum distance value.

As noted above, the mix amount, first orientation and second orientation may be used to determine an orientation of the representation. The following is an example equation for determining the orientation of the representation: orientation_of_the_reprentation=first_orientation*(1−mix_amount)+second_orientation*mix_amount, where first_orientation is the first orientation and the second_orientation is the second orientation. In this regard, when the average location is equal to the representative point, the orientation of the representation will be the first orientation. As the distance between the average location and the representative point increases, the mix value increases, thereby increasing the influence of the second orientation on the orientation of the representation until the distance to the representative point is equal to the maximum distance value, and the representative orientation is set to the second orientation. In this regard, a 50% contribution from each of the first orientation and second orientation would be set as the orientation of the representation when the distance to the representative point is half of the maximum distance value. If the distance to the representative point is greater than the maximum distance value, as discussed below, a different, closer representative point for a different lane may be used to determine the orientation of the representation or the orientation of the representation may simply be set to the second orientation. This can reduce or prevent large rotations between generated representations for the same object In addition, the position of the representation can be determined using the map information, including the reference point. As an example, a first position can be the position of the reference point. A second position can be the average location. As with the width and orientation examples, the first position and the second position can be combined together to determine a position of the representation based on the proximity of the average location to the representative point. As an example, the first and second positions may be combined together using the mix amount based on the distance between the average location and the representative point and a maximum distance value. Again, the following is an example equation for determining a mix amount: mix_amount=distance_to_representative_point/maximum distance value.

As noted above, the mix amount, first position and second position may be used to determine a position of the representation. The following is an example equation for determining the position of the representation: position_of_the_reprentation=first_position*(1−mix_amount)+second_position*mix_amount, where first_position is the first position and the second_position is the second position. In this regard, when the average location is equal to the representative point, the position of the representation will be the first position. As the distance between the average location and the representative point increases, the mix value increases, thereby increasing the influence of the second position on the position of the representation until the distance to the representative point is equal to the maximum distance value, and the representative position is set to the second position. In this regard, a 50% contribution from each of the first position and second position would be set as the position of the representation when the distance to the representative point is half of the maximum distance value. If the distance to the representative point is greater than the maximum distance value, as discussed below, a different, closer representative point for a different lane may be used to determine the position of the representation or the position of the representation may simply be set to the second position. This can reduce or prevent large lateral shifts between generated representations for the same object.

Once the characteristics for the representation are determined as discussed above, the representation may be displayed to a passenger or passengers of the vehicle. For instance, the representation may be displayed on internal electronic display 152 or another display. Again, while these characteristics are adjusted for display to a passenger, the characteristics should not be adjusted for the purposes of maneuvering the vehicle for the safety of the vehicle and its passengers.

Figure 11:
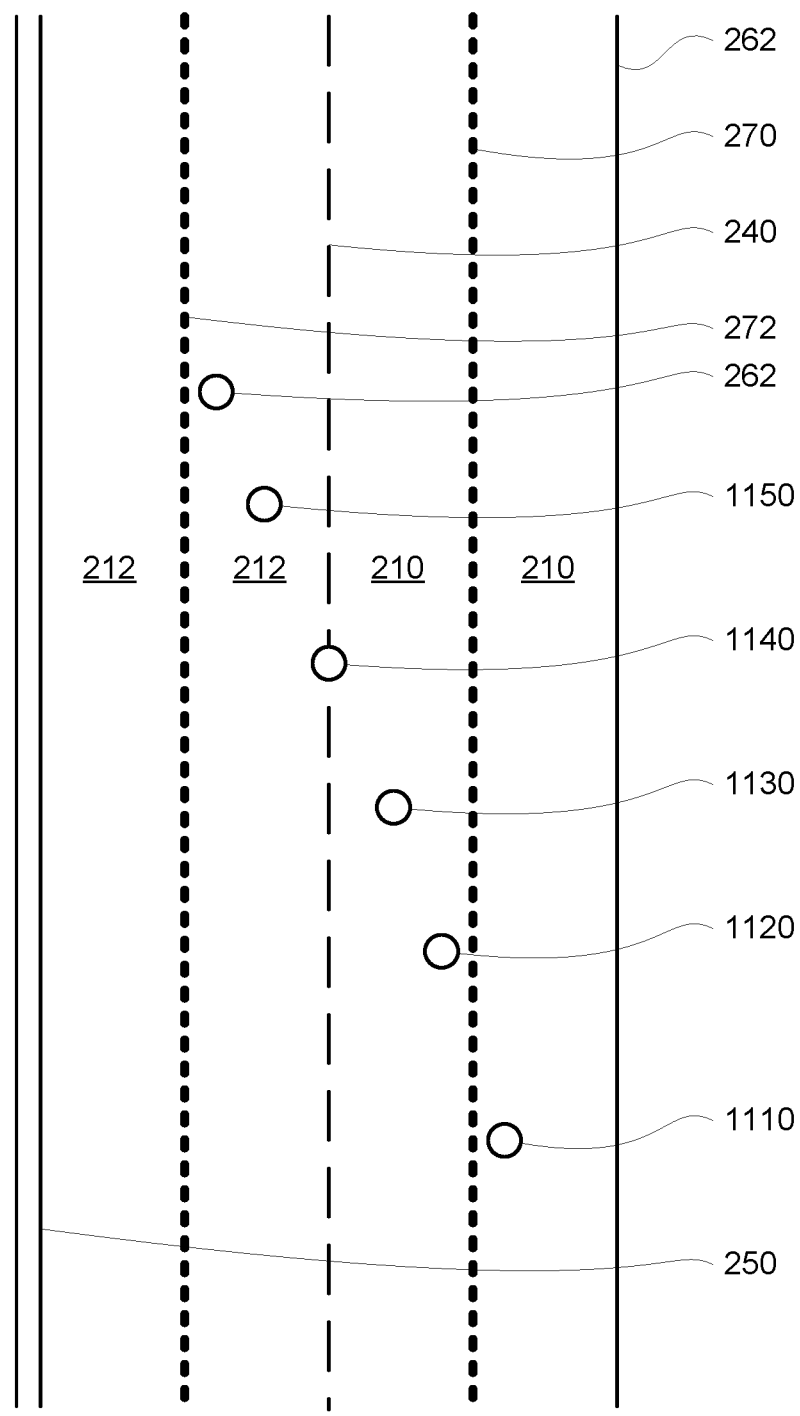
FIG. 11 is a view of a section of roadway and data in accordance with aspects of the disclosure.

In many cases, the object may actually move out of a lane or parking spot. When this is the case, as noted above, the representative point for a lane or parking spot has less and less influence on the shape (length, width, etc.), orientation, and position of the object. Of course, as the average location of the set of data points of an objects moves closer to another center point, this new center point may become the reference point for generating a representation as described above. In addition, when distance between the average location to a center point for one lane becomes greater than the maximum distance value, that center point may no longer be used as a representative point. For example, FIG. 11 is a view of lanes 210 and 212 depicting circles 1110, 1120, 1130, 1140, 1150 corresponding to average locations of sets of data points for an object moving along lanes 210 and 212 over time (in sequence from 1110 to 1150). As can be seen, circle 1110 corresponds to the object being proximate to center line 270. Between circle 1110 and circle 1120, the object crosses over center line 270, and thereafter moves towards lane line 240 as shown by circle 1130. As the average location moves away from the center line 270 (from circle 1120 to circle 1130 and eventually to circle 1140), the corresponding reference points on center line 270 will have less of an influence on the characteristics of the representation of the object. At circle 1140, midway between center line 270 and center line 272, the corresponding reference points may have no effect on the characteristics. In other words, the second width, second orientation, a and second position may be set as the width, orientation, and position of the representation, or rather, those characteristics may simply correspond to the characteristics determined from the set of data points for each circle (as discussed above). In this regard, transitions of representations between different lanes will appear much smoother. Again as noted above, as the object moves closer to center line 272, as in circles 1140 and 1150, the corresponding reference points on center line 272 will have a greater influence on the characteristics of the reference points.

In the event that the map information does not include the center point or lane information discussed above, the width, orientation, and position values for a representation may be determined from the set of data points as discussed above.

In some instances, representations can be generated based on prior observed information. For instance, the length or width of the representation can be determined from a prior determined length or width of a prior set of data points. As an example, the length of a large object such as a bus or tractor trailer may appear to shift as the relative position between the orientation of the object (really, the second orientation or the orientation determined from the set of data points) and the object changes. In other words, when the vehicle is directly behind an object, seeing only the object's back end, the set of data points would include few if any data points from the adjacent sides of the object. Thus, the object can appear to be a very short object, even if it is a very long object, such as a bus or tractor trailer. As the vehicle's orientation changes or the object turns, the angle between the vehicle's orientation and the object's back end will increase, and the set of data points may include more points from an adjacent side of the object, thus providing more information about the object's length. Similarly, as the angle between the vehicle and the object decreases, the set of data points would include fewer points from the adjacent sides of the object. This can cause a representation of the object to appear to change size over a short period of time, and thus give the passenger the impression that the vehicle's computing devices are not fully detecting or identifying the object as a bus or tractor trailer.

By using prior length or width dimensions from a prior set of data points as the length or width of the representation, this may reduce the likelihood of dramatic changes in the length or width of the representation as discussed above.

Whether to use a prior length or width dimension from a prior set of data points may be based on whether the length or width of a current set of data points is "trusted." A length or width dimension of a side an object may not be "trusted" where the number of data points for that side is relatively low (i.e. does not meet a threshold) or where the angular width of the side (the angle between the laser or heading of the vehicle and the side) does not meet a minimum threshold value. In this regard, the computing devices 100 may determine an angular width of the length or width of an object from the set of data points. If the angular width of the length of the object from the set of data points does not meet the minimum threshold value, such as less than 1 degree or more or less, or zero, the width may not be a "trusted" value. In that regard a prior "trusted" width may be used as the width of the representation. Similarly, if the angular width of the length of the object from the set of data points is larger than the minimum threshold value, such as equal to or greater than 1 degree or more or less, the length may be a "trusted" value. In that regard, the "trusted" length may be used as the width of the representation. Of course, the same may also be true for the width of the object, Moreover, when a current width of the object (from the current set of data points) is not "trusted," the prior "trusted" width may be set as the first width. In this regard, the width of the representation may be determined based on a combination of this prior width (as a first width) and a second width as discussed above.

Figure 12:
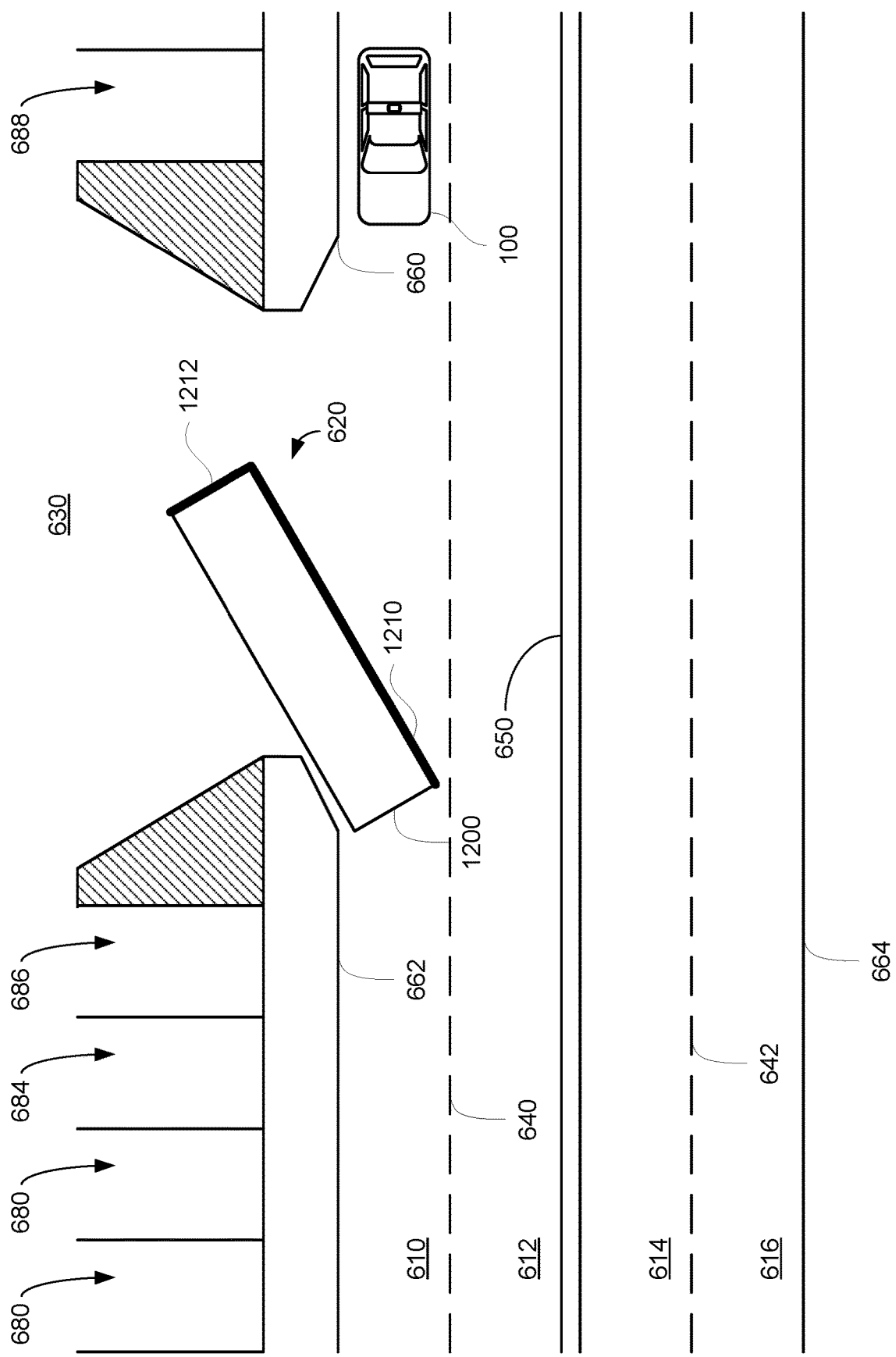
FIG. 12 is a view of a section of roadway in accordance with aspects of the disclosure.

For instance, turning to FIG. 12, a bus 1200 is pulling out of entrance/exit area 620 for parking lot 630 and into lane 610. In this example, the set of data points for the bus generated by a laser of the perception system includes both long side 1210 and short side 1212. Thus, at this point, the angular width for both the long side 1210 and short side 1212 are relatively large (i.e. greater than 1 degree). Accordingly, the length and width of the representation may be set to the length and width of the set of data points, as the length and width of the set of data points would be "trusted."

Figure 13:
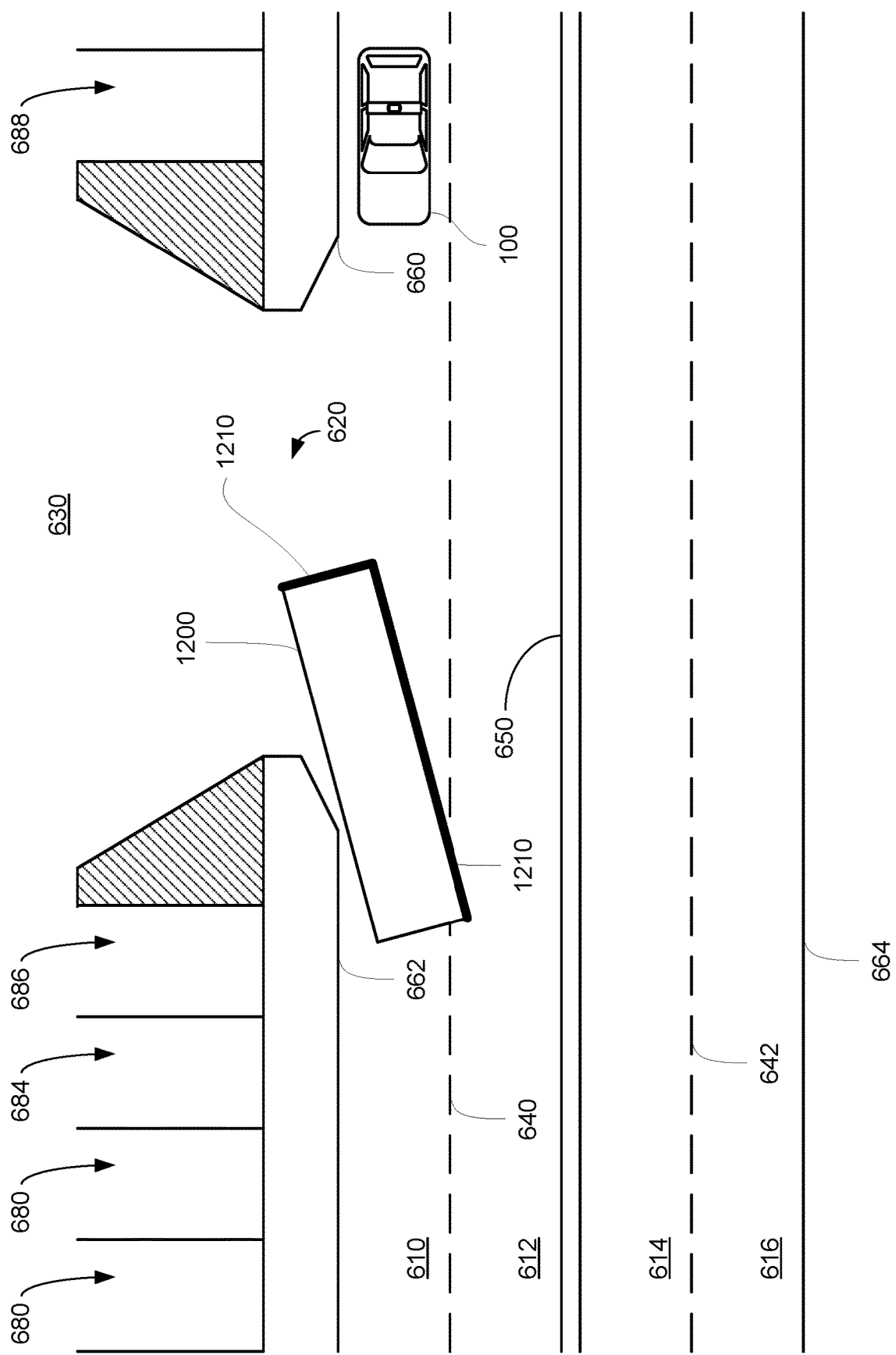
FIG. 13 is a view of a section of roadway in accordance with aspects of the disclosure.

In FIG. 13, bus 1200 moved further into lane 610 and the angle between the short side 1212 and the laser has decreased, but both long side 1210 and short side 1212 are still visible to the vehicle's laser. Thus, at this point, the angular width for both the long side 1210 and short side 1212 are relatively large (i.e. greater than 1 degree). Accordingly, the length and width of the representation may be set to the length and width of the set of data points, as the length and width of the set of data points would be "trusted."

Figure 14:
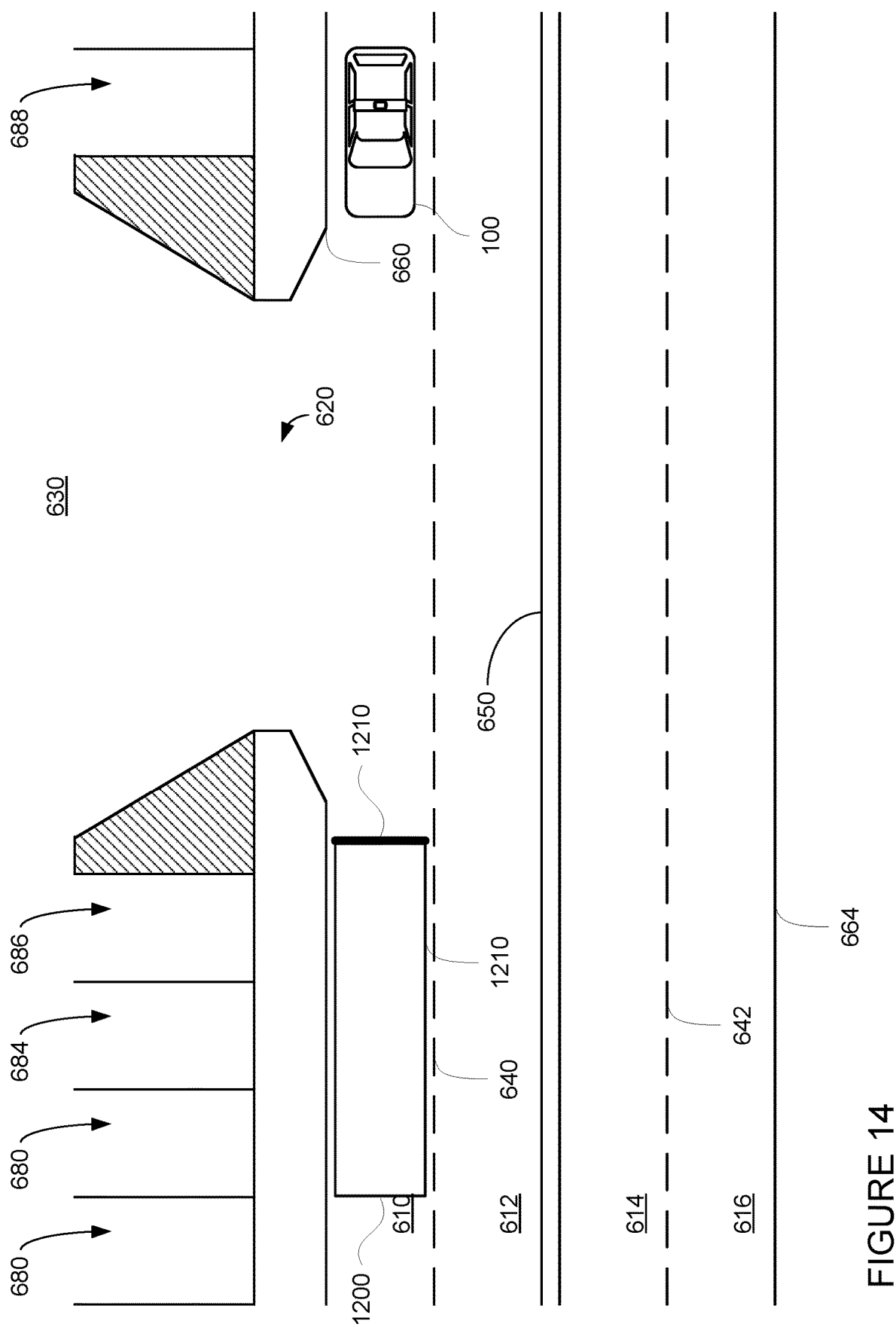
FIG. 14 is a view of a section of roadway in accordance with aspects of the disclosure.

In FIG. 14, the bus 1200 has completely entered lane 610. At this point, the angle width of the long side 1210 is near zero. Thus, few if any data points of the set of data points would correspond to the long side 1210. Accordingly, the length of the long side 1210 in FIG. 14, would not be "trusted." In that regard, a representation generated based on the set of data points generated from the example of FIG. 14 would appear to be an object significantly shorter than the bus. In this example, the length of the bus 1210 determined from the set of data points generated at the time of the example of FIG. 13 or the time of the example of FIG. 12, both of which were "trusted", may be used to generate a representation based for the example of FIG. 14. Thus, the length of the representation of the object will appear to be more consistent over time to passengers of the vehicle.

Figure 15:
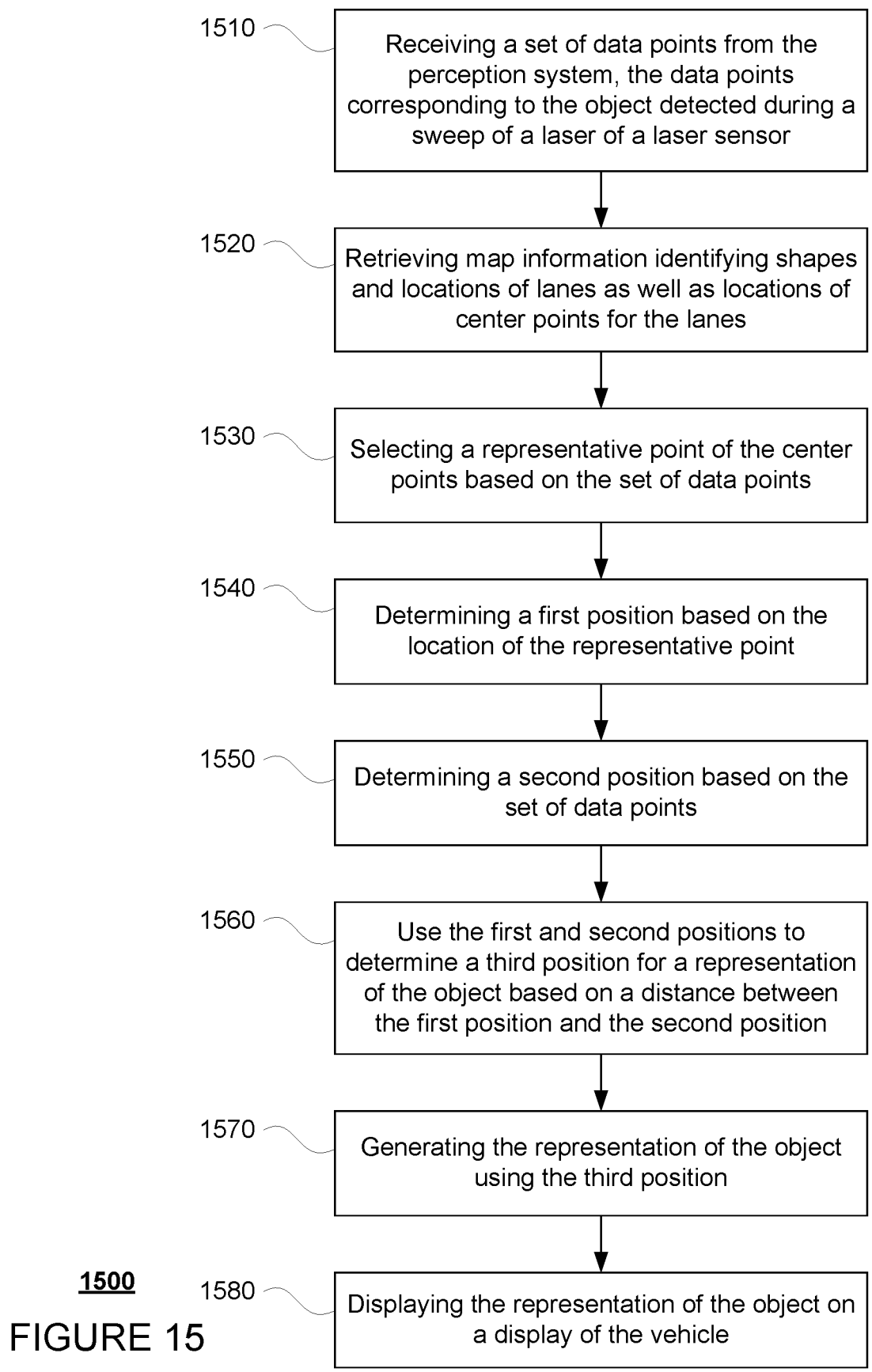
FIG. 15 is a flow diagram in accordance with aspects of the disclosure.

FIG. 15 is an example flow diagram 1500 in accordance which may be performed by one or more processors of one or more computing devices of a vehicle, such as computing devices 110 of vehicle 100, in order to generate a representation of an object detected by a perception system of a vehicle. In this example, a set of data points is received from the perception system at block 1510. The data points correspond to the object detected during a sweep of a laser of a laser sensor. Map information identifying shapes and locations of lanes as well as locations of center points for the lanes is retrieved at block 1520. A representative point of the center points is selected based on the set of data points at block 1530. A first position is determined based on the location of the representative point at block 1540. A second position is determined based on the set of data points at block 1550. The first position and the second position are used in order to determine a third position for a representation of the object based on a distance the first position and the second position at block 1560. The he representation of the object is generated using the third position at block 1570. The representation of the object is displayed on a display of the vehicle at block 1580.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for generating a smoothed representation of an object detected by a perception system of a vehicle, the method comprising:

receiving, by one or more processors, a set of data points from the perception system, the data points of the set of data points corresponding to the object detected during a sweep of a laser of a laser sensor;

retrieving, by the one or more processors, map information identifying shapes and locations of lanes as well as locations of center points for the lanes;

selecting, by the one or more processors, a representative point from the center points based on the set of data points;

determining, by the one or more processors, a first position for the smoothed representation of the object based on the location of the representative point;

determining, by the one or more processors, a second position for the smoothed representation of the object based on the set of data points;

using, by the one or more processors, the first position and the second position in order to determine a third position for the smoothed representation of the object based on a distance between the first position and the second position;

generating, by the one or more processors, the smoothed representation of the object using the third position; and displaying, by the one or more processors, the smoothed representation of the object on a display of the vehicle.

2. The method of claim 1, wherein the first position and the second position are used such that:

when the distance is a first distance, the first position has a first contribution to the third position, and when the distance is a second distance greater than the first distance, the second position has a second contribution to the third position that is greater than the first contribution.

3. The method of claim 1, wherein the map information further includes heading information identifying headings for the lanes, and the method further comprising:

determining a first orientation based on the heading of the lane associated with the representative point;

determining a second orientation based on the set of data points; and combining the first orientation and the second orientation in order to determine a third orientation for the smoothed representation of the object based on the distance, and wherein the smoothed representation for the object is generated using the third orientation.

4. The method of claim 3, wherein the first orientation and the second orientation are used such that:

when the distance is a first distance, the first orientation has a first contribution to the third orientation, and when the distance is a second distance greater than the first distance, the second orientation has a second contribution to the third orientation that is greater than the first contribution.

5. The method of claim 3, further comprising determining a mix value based on a distance between the first position and the second position, and wherein the third orientation is determined using the equation: first_orientation*(1−mix value)+second_orientation*mix value, where first_orientation is the first orientation and the second_orientation is the second orientation.

6. The method of claim 1, further comprising:
determining a first width for the smoothed representation of the object based on a width of the lane associated with the representative point;
determining a second width for the smoothed representation of the object based on the set of data points; and
combining the first width and the second width in order to determine a third width for the smoothed representation of the object based on the distance, and wherein the smoothed representation for the object is generated using the third width.

7. The method of claim 6, wherein the first width and the second width are combined such that:
when the distance is a first distance, the first width has a first contribution to the third width, and
when the distance is a second distance greater than the first distance, the second width has a second contribution to the third width that is greater than the first contribution.

8. The method of claim 6, further comprising determining a mix value based on a distance between the first position and the second position, and wherein the third width is determined using the equation: first_width*(1−mix value)+second_width*mix value, where first_width is the first width and the second_width is the second width.

9. The method of claim 1, further comprising:
prior to receiving the set of data points, receiving an earlier set of data points corresponding to the object detected during a first sweep of the laser prior to the sweep of the laser; and
determining a length based on the earlier set of data points, and
wherein generating the smoothed representation of the object is further based on the length.

10. The method of claim 9, wherein the length is determined further based on an angular width of a side of the object corresponding to the length from a perspective of the laser.

11. The method of claim 10, wherein the length is determined further based on whether the angular width is less than a minimum threshold angular width value.

12. The method of claim 1, further comprising determining a mix value based on a distance between the first position and the second position, and wherein determining the third position includes using the mix value in conjunction with the first position and the second position.

13. The method of claim 12, further comprising determining the third position includes using the mix value to determine a first contribution by the first position and a second contribution by the second position.

14. The method of claim 13, wherein determining the third position includes summing the first contribution and the second contribution.

15. The method of claim 12, wherein the mix value is further determined based on a value representative of half a width of a lane.

16. The method of claim 12, wherein the mix value is further based on a maximum distance value corresponding to one of half of an actual width of the lane at the location of the representative point, half an average width of the lane, or half an average width or default width value for lanes less a predetermined distance.

17. The method of claim 16, wherein determining the mix value includes dividing the distance between the first position and the second position by the maximum distance value.

18. The method of claim 1, further comprising, using information from the perception system regarding the object in order to control the vehicle in an autonomous driving mode, and wherein the smoothed representation of the object is not used to control the vehicle in the autonomous driving mode.

19. The method of claim 1, wherein the smoothed representation reduces lateral shifts in the location of the object when displayed on the display.

20. The method of claim 1, further comprising determining a mix value based on a distance between the first position and the second position, and wherein the third position is determined using the equation: first_position*(1−mix value)+second_position*mix value, where first_position is the first position and the second_position is the second position.

21. A method for generating a smoothed representation of an object detected by a perception system of a vehicle, the method comprising:
receiving, by one or more processors, a set of data points from the perception system, the data points of the set of data points corresponding to the object detected during a sweep of a laser of a laser sensor;
determining a location of the object from the set of data points;
accessing map information identifying center points of traffic lanes to identify a center point of a traffic lane that is closest to the location;
determining a location for the smoothed representation of the object based on a distance between the identified center point and the location of the object; and
displaying, by the one or more processors, the smoothed representation of the object on a display of the vehicle based on the location for the smoothed representation of the object.

22. The method of claim 21, wherein the map information further includes heading information identifying headings for the lanes, and the method further comprises:
determining an orientation of the object based on the set of data points; and
determining an orientation for the smoothed representation of the object based on the orientation of the object and the distance between the identified center point and the location of the object, and
wherein displaying the smoothed representation is further based on the orientation for the smoothed representation.

23. The method of claim 21, further comprising:
determining a width of the object based on the set of data points; and
determining a width for the smoothed representation of the object based on the width of the object and the distance between the identified center point and the location of the object, and
wherein displaying the smoothed representation is further based on the width for the representation.

* * * * *